United States Patent
Park et al.

(10) Patent No.: US 11,307,378 B2
(45) Date of Patent: Apr. 19, 2022

(54) LENS DRIVING DEVICE, CAMERA MODULE AND OPTICAL APPARATUS

(71) Applicant: LG INNOTEK CO., LTD., Seoul (KR)

(72) Inventors: Sang Ok Park, Seoul (KR); Sang Jun Min, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 106 days.

(21) Appl. No.: 16/827,475

(22) Filed: Mar. 23, 2020

(65) Prior Publication Data

US 2020/0233177 A1 Jul. 23, 2020

Related U.S. Application Data

(63) Continuation of application No. 16/279,669, filed on Feb. 19, 2019, now Pat. No. 10,634,869, which is a
(Continued)

(51) Int. Cl.
*G02B 7/02* (2021.01)
*G02B 7/09* (2021.01)
(Continued)

(52) U.S. Cl.
CPC ............... *G02B 7/09* (2013.01); *G03B 3/10* (2013.01); *H04N 5/2254* (2013.01); *G03B 2205/0069* (2013.01)

(58) Field of Classification Search
CPC .... G02B 7/09; G03B 3/10; G03B 2205/0069; G03B 5/00; G03B 13/36; H04N 5/2254; F16F 15/04
(Continued)

(56) References Cited

U.S. PATENT DOCUMENTS

2010/0080545 A1 4/2010 Fan et al.
2011/0252782 A1 10/2011 Nobe
(Continued)

FOREIGN PATENT DOCUMENTS

CN 1933303 A 3/2007
CN 201188142 Y 1/2009
(Continued)

OTHER PUBLICATIONS

Office Action dated Sep. 30, 2019 in Chinese Application No. 201610203598.3.
(Continued)

*Primary Examiner* — James C. Jones
(74) *Attorney, Agent, or Firm* — Saliwanchik, Lloyd & Eisenschenk

(57) ABSTRACT

A lens driving device is provided, the lens driving device includes: a housing; a bobbin disposed inside of the housing; a support member coupled to the bobbin and the housing; and a sensor sensing a position of at least one of the bobbin and the housing, wherein the support member may include a first support unit, and a second support unit disposed not parallel to the first support unit, wherein the sensor may be disposed more adjacent to the first support unit than to the second support unit, and wherein an elastic modulus of the first support unit may be lower than an elastic modulus of the second support unit.

20 Claims, 9 Drawing Sheets

Related U.S. Application Data continuation of application No. 16/105,178, filed on Aug. 20, 2018, now Pat. No. 10,247,905, which is a continuation of application No. 15/086,840, filed on Mar. 31, 2016, now Pat. No. 10,088,645.

(51) Int. Cl.
*G03B 3/10* (2021.01)
*H04N 5/225* (2006.01)

(58) Field of Classification Search
USPC .......................................... 359/824
See application file for complete search history.

(56) References Cited

U.S. PATENT DOCUMENTS

| | | | |
|---|---|---|---|
| 2012/0092768 | A1 | 4/2012 | Shiraki et al. |
| 2013/0120861 | A1 | 5/2013 | Park et al. |
| 2014/0327965 | A1 | 11/2014 | Chen et al. |
| 2014/0327978 | A1* | 11/2014 | Min ................ G03B 3/10 359/824 |
| 2015/0177479 | A1 | 6/2015 | Lee et al. |
| 2016/0139426 | A1 | 5/2016 | Park |

FOREIGN PATENT DOCUMENTS

| | | |
|---|---|---|
| CN | 101630057 A | 1/2010 |
| CN | 102445811 A | 5/2012 |
| CN | 102645815 A | 8/2012 |
| CN | 202600243 U | 12/2012 |
| CN | 102955324 A | 3/2013 |
| CN | 203589416 U | 5/2014 |
| CN | 104423012 A | 3/2015 |
| CN | 105607383 A | 5/2016 |
| KR | 10-2013-0125476 A | 11/2013 |
| KR | 10-1338562 B1 | 12/2013 |
| KR | 10-2014-0024980 A | 3/2014 |
| KR | 10-2014-0119360 A | 10/2014 |
| WO | WO-2012/153600 A1 | 11/2012 |

OTHER PUBLICATIONS

Office Action dated Jul. 9, 2019 in U.S. Appl. No. 16/279,669.
Notice of Allowance dated Dec. 23, 2019 in U.S. Appl. No. 16/279,669.
Office Action dated Sep. 22, 2017 in U.S. Appl. No. 15/086,840.
Notice of Allowance dated May 18, 2018 in U.S. Appl. No. 15/086,840.
Notice of Allowance dated Nov. 19, 2018 in U.S. Appl. No. 16/105,178.
Office Action dated Oct. 12, 2021 in Korean Application No. 10-2015-0047635.
Office Action dated Oct. 12, 2021 in Korean Application No. 10-2015-0063612.
Office Action dated Jan. 12, 2022 in Chinese Application No. 202011023580.8.

* cited by examiner

LENS DRIVING DEVICE, CAMERA MODULE AND OPTICAL APPARATUS

CROSS-REFERENCE TO RELATED APPLICATIONS

This application is a continuation of U.S. application Ser. No. 16/279,669, filed Feb. 19, 2019; which is a continuation of U.S. application Ser. No. 16/105,178, filed Aug. 20, 2018, now U.S. Pat. No. 10,247,905, issued Apr. 2, 2019; which is a continuation of U.S. application Ser. No. 15/086,840, filed Mar. 31, 2016, now U.S. Pat. No. 10,088,645, issued Oct. 2, 2018; which claims priority under 35 U.S.C. § 119 to Korean Patent Application Nos. 10-2015-0047635, filed Apr. 3, 2015; and 10-2015-0063612, filed May 7, 2015; all of which are hereby incorporated by reference in their entirety.

TECHNICAL FIELD

The present exemplary embodiments relate to a lens driving device, a camera module, and an optical apparatus.

BACKGROUND

The technology described in this section is merely intended to provide background information of an exemplary embodiment of the present disclosure, and does not mean the prior art.

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data.

Meanwhile, camera modules having AF (Auto Focus) functions are popularly used. Here, an auto focus feedback is required to be used for more precise AF control.

However, the conventional camera module having the auto focus feedback function suffers from disadvantages in that an elastic member oscillates when an external force corresponding to a natural vibration frequency of the elastic member is applied to the camera module.

Furthermore, a sufficient length for the elastic member cannot be obtained in the conventional camera module having AF or OIS function, due to spatial restriction.

BRIEF SUMMARY

Technical Challenge

In order to solve the foregoing problems of the conventional art, a lens driving device is provided herein, whereby the lens driving device can minimize the oscillation phenomenon that may occur during the auto focus feedback control, through a modified shape of a support member.

In addition, a lens driving device with a sufficient length of the elastic member is provided herein.

In addition, a lens driving device applicable with a long and wide elastic member is provided herein.

In addition, a camera module and an optical apparatus including the lens driving device are provided herein.

Technical Solution

Therefore, an object of the present disclosure is to solve at least one or more of the above problems and/or disadvantages in whole or in part and to provide at least advantages described hereinafter.

In order to achieve at least the above objects, in whole or in part, and in accordance with the purposes of the present disclosure, as embodied and broadly described, and in a general aspect, there is provided a lens driving device, the lens driving device comprising: a housing; a bobbin disposed at an inner side of the housing; a support member coupled to the bobbin and the housing; and a sensor sensing a position of at least one of the bobbin and the housing, wherein the support member may include a first support unit, and a second support unit disposed not parallel to the first support unit, wherein the sensor may be disposed more adjacent to the first support unit than to the second support unit, and wherein an elastic modulus of the first support unit may be lower than an elastic modulus of the second support unit.

In some exemplary embodiments, the first support unit may be disposed along a y-axis direction perpendicular to an optical axis direction of a lens module coupled to the bobbin, and the second support unit may be disposed along an x-axis direction perpendicular to the optical axis and to the y-axis.

In some exemplary embodiments, the support member may include: a third support unit disposed apart from and parallel to the first support unit; and a fourth support unit disposed apart from and parallel to the second support unit.

In some exemplary embodiments, an x-axis elastic modulus of the first support unit and the third support unit may be lower than a y-axis elastic modulus of the second support unit and the fourth support unit.

In some exemplary embodiments, the support member may include: an upper support member connecting an upper portion of the housing and an upper portion of the bobbin; and a lower support member connecting a lower portion of the housing and a lower portion of the bobbin, wherein a support member, chosen between the upper elastic member and the lower elastic member, disposed adjacent to the sensor may include the first to the fourth support units.

In some exemplary embodiments, the first support unit may include: a first support portion disposed closer to the y-axis direction than to the x-axis direction; and a second support portion disposed closer to the x-axis direction than to the y-axis direction, wherein an elastic modulus of the first support portion may be lower than an elastic modulus of the second support portion.

In some exemplary embodiments, the second support unit may include: a first support portion disposed closer to the y-axis direction than to the x-axis direction; and a second support portion disposed closer to the x-axis direction than to the y-axis direction, wherein an elastic modulus of the first support portion may be lower than an elastic modulus of the second support portion.

In some exemplary embodiments, a thickness of the first support unit may be thinner than a thickness of the second support unit.

In some exemplary embodiments, a width of the first support unit may be thinner than a width of the second support unit.

In some exemplary embodiments, a length of the first support unit is longer than a length of the second support unit.

In some exemplary embodiments, the lens driving device may further comprise: an FPCB (Flexible Printed Circuit Board) being applied with electric power from an external source; and a lateral support member supporting the housing with respect to a base, and electrically connecting the FPCB and the upper support member, wherein the sensor may be supplied with electric power from the upper support member.

In some exemplary embodiments, the lens driving device may further comprise a connecting member electrically connecting the upper support member and the lower support member, wherein a coil disposed at an outer circumferential surface of the bobbin may be supplied with electric power from the lower elastic member.

In some exemplary embodiments, the upper support member may further include first to sixth support units, the first to the fourth support units may be connected to the sensor, and the fifth support unit and the sixth support unit may be connected to the lower support member.

In some exemplary embodiments, the lens driving device may further comprise: a first driving portion disposed at the bobbin; and a second driving portion disposed at the housing, and facing the first driving portion.

In some exemplary embodiments, the lens driving device may further comprise: a third driving portion disposed at a lower side of the housing, and facing the second driving portion.

In some exemplary embodiments, the first driving portion may include a coil, the second driving portion may include a magnet, and the third driving portion may include a coil.

In some exemplary embodiments, the support member may be electrically connected to the sensor and the first driving portion.

In another general aspect, there is provided a lens driving device, the lens driving device comprising: a bobbin; a housing spaced apart from the bobbin, and disposed an outer side of the bobbin; a support member coupled to the bobbin and the housing; and a sensor sensing a position of the bobbin, wherein the support member may include a first support unit disposed parallel to an x-axis perpendicular to an optical axis of a lens module coupled to the bobbin, and a second support unit disposed parallel to a y-axis perpendicular to the optical axis and to the x-axis, wherein the sensor may be disposed closer to the first support unit than to the second support unit, and wherein an elastic modulus of the first support unit may be lower than an elastic modulus of the second support unit.

In still another general aspect, there is provided a camera module, the camera module comprising: a housing; a bobbin disposed at an inner side of the housing; a support member coupled to the bobbin and the housing; and a sensor sensing a position of at least one of the bobbin and the housing, wherein the support member may include a first support unit, and a second support unit disposed not parallel to the first support unit, wherein the sensor may be disposed more adjacent to the first support unit than to the second support unit, and wherein an elastic modulus of the first support unit may be lower than an elastic modulus of the second support unit.

In still another general aspect, there is provided an optical apparatus, the optical apparatus comprising: a housing; a bobbin disposed at an inner side of the housing; a support member coupled to the bobbin and the housing; and a sensor sensing a position of at least one of the bobbin and the housing, wherein the support member may include a first support unit, and a second support unit disposed not parallel to the first support unit, wherein the sensor may be disposed more adjacent to the first support unit than to the second support unit, and wherein an elastic modulus of the first support unit may be lower than an elastic modulus of the second support unit.

In still another general aspect, there is provided a lens driving device, the lens driving device comprising: a bobbin movably disposed at an inner side of a housing; a support member elastically connecting the bobbin and the housing; and a sensor sensing a relative position of the bobbin and the housing, wherein the support member may include: a first support unit and a second support unit disposed in a y-axis direction and facing each other; and a third support unit and a fourth support unit disposed in a y-axis direction and facing each other, wherein the sensor may be disposed mostly adjacent to the first support unit among the first to the fourth support units, and wherein an elastic modulus of the first and the second support units may be lower than an elastic modulus of the third and the fourth support units.

In some exemplary embodiments, an elastic modulus of the first and the second support units may be lower than an elastic modulus of the third and the fourth support units.

In some exemplary embodiments, wherein the support member may include: an upper support member connecting an upper portion of the housing and an upper portion of the bobbin; and a lower support member connecting a lower portion of the housing and a lower portion of the bobbin, wherein a support member, chosen between the upper elastic member and the lower elastic member, disposed adjacent to the sensor may include the first to the fourth support units.

In some exemplary embodiment, first support unit may include: a first support portion disposed closer to the y-axis direction than to the x-axis direction; and a second support portion disposed closer to the x-axis direction than to the y-axis direction, wherein an elastic modulus of the first support portion may be lower than an elastic modulus of the second support portion.

In some exemplary embodiments, the second support unit includes: a first support portion disposed closer to the y-axis direction than to the x-axis direction; and a second support portion disposed closer to the x-axis direction than to the y-axis direction, wherein an elastic modulus of the first support portion is lower than an elastic modulus of the second support portion.

In some exemplary embodiments, a thickness of the first support unit and the second support unit may be thinner than a thickness of the third support unit and the fourth support unit.

In some exemplary embodiments, a width of the first support unit and the second support unit may be thinner than a width of the third support unit and the fourth support unit.

In some exemplary embodiments, a length of the first support unit and the second support unit may be thinner than a length of the third support unit and the fourth support unit.

In some exemplary embodiments, the lens driving device may further comprise: an FPCB (Flexible Printed Circuit Board) being applied with electric power from an external source; and a lateral support member supporting the housing with respect to a base, and electrically connecting the FPCB and the upper support member, wherein the sensor may be supplied with electric power from the upper support member.

In some exemplary embodiments, the lens driving unit may further comprise: a connecting member electrically connecting the upper support member and the lower support member, wherein a coil disposed at an outer circumferential surface of the bobbin is supplied with electric power from the lower elastic member.

In some exemplary embodiments, the upper support member may further include a fifth support unit and a sixth support unit, the first to the fourth support units may be connected to the sensor, and the fifth support unit and the sixth support unit may be connected to the lower support member.

In still another aspect, there is provided a camera module, the camera module comprising: a bobbin movably disposed at an inner side of a housing; a support member elastically connecting the bobbin and the housing; a sensor sensing a relative position of the bobbin and the housing; and a controller configured to apply a moving signal for to the bobbin, and to feedback-control a movement of the bobbin by being connected with the sensor, wherein the support member may include: a first support unit and a second support unit disposed in a first direction and facing each other; and a third support unit and a fourth support unit disposed in a second direction perpendicular to the first direction and facing each other, wherein the sensor may be disposed mostly adjacent to the first support unit among the first to the fourth support units, and wherein an elastic modulus of the support member in the second direction may be lower than an elastic modulus of the support member in the first direction.

In some exemplary embodiments, the support member may include: an upper support member connecting an upper portion of the housing and an upper portion of the bobbin; and a lower support member connecting a lower portion of the housing and a lower portion of the bobbin, wherein a support member, chosen between the upper elastic member and the lower elastic member, disposed adjacent to the sensor may have an elastic modulus higher than an elastic modulus of another support member.

In some exemplary embodiments, the first support unit may include: a first support portion arranged in the first direction; and a second support portion arranged in the second direction, wherein a width of the first support portion may be narrower that a width of the second support portion.

In still another general aspect, there is provide an optical apparatus, the optical apparatus comprising: a main body; a display unit installed at the main body and configured to display information; and a camera module installed at the main body and configured to photograph an image or a picture, wherein the camera module may include: a bobbin movably disposed at an inner side of a housing; a support member elastically connecting the bobbin and the housing; and a sensor sensing a relative position of the bobbin and the housing, wherein the support member may include: a first support unit and a second support unit disposed in a first direction and facing each other; and a third support unit and a fourth support unit disposed in a second direction and facing each other, wherein the sensor may be disposed mostly adjacent to the first support unit among the first to the fourth support units, and wherein the support member may have an elastic force with respect to a tilt in the second direction lower than an elastic force with respect to a tilt in the first direction.

In still another general aspect, there is provided a lens driving device, the lens driving device comprising: a first driving portion; a bobbin disposed with the first driving portion; a second driving portion facing the first driving portion; a housing disposed at an outside of the bobbin, and disposed with a second driving portion; and a support member movably supporting the bobbin with respect to the housing, wherein the bobbin may include a support portion formed at an outer circumferential surface and supporting the first driving portion, and wherein the support portion may include a plurality of support bodies disposed along an outer circumferential surface of the bobbin and spaced apart from each other.

In some exemplary embodiments, a separating space may be formed between the plurality of support bodies, and the support member may be disposed at the separating space.

In some exemplary embodiments, the support member may include an inner side portion coupled to the bobbin, an outer side portion coupled to the housing, and a connecting portion connecting the inner side portion and the outer side portion, wherein the connecting portion may be disposed at the separating space.

In some exemplary embodiments, the support member may include four support units disposed at a virtual single plane, wherein any one of the four support units may include a first inner side portion coupled to the bobbin, a first outer side portion coupled to the housing, and a first connecting portion connecting the first inner side portion and the first outer side portion.

In some exemplary embodiments, the first connecting portion may include a plurality of bent portions formed being bent or curved, wherein at least two of the plurality of bent portions may be disposed at the separating space.

In some exemplary embodiments, the separating space may be provided in plural number, wherein at least a part of the first connecting portion may be disposed at at least two of the separating spaces provided in plural number.

In some exemplary embodiments, the plurality of support bodies may include a first support body, a second support body disposed adjacent to the first support body, and a third support body disposed adjacent to the second support body, wherein the separating space may include: a first separating space disposed between the first support body and the second support body; and a second separating space disposed between the second support body and the third support body, and wherein at least a part of the first connecting portion may be disposed at the first separating space and at the second separating space.

In some exemplary embodiments, the housing may include: a first housing edge portion formed by encounter of side surfaces of the housing; and a second housing edge portion disposed adjacent to the first housing edge portion, wherein the first outer side portion may be disposed closer to the first housing edge portion than to the second housing edge portion, and the first inner side portion may be disposed closer to the second housing edge portion than to the first housing edge portion.

In some exemplary embodiments, the separating space may be spaced apart from each of the first housing edge portion and the second housing edge portion at a corresponding distance from the first housing edge portion and the second housing edge portion, respectively.

In some exemplary embodiments, the plurality of support bodies may include eight support bodies, and eight separation spaces may be formed between the eight support bodies, respectively.

In some exemplary embodiments, the support member may include: an upper support member connecting an upper portion of the bobbin and an upper portion of the housing; a lower support member connecting a lower portion of the bobbin and a lower portion of the housing, wherein a separating space may be formed between the plurality of support bodies, and the lower support member may be disposed at the separating space.

In some exemplary embodiments, the first driving portion may include a coil having a pair of lead cables, the lower support member may be provided in a pair, and each of the pair of the lower support members may be electrically connected to each of the pair of the lead cables.

In some exemplary embodiments, the bobbin may include a sensor unit sensing a travel amount or a position of the bobbin with respect to the housing, wherein the upper support member may be connected to the sensor unit, and the upper support member may be separately provided as at least six separated ends, and wherein four of the six separated ends may be electrically connected to the sensor unit, and rest two of the six separated ends may be electrically connected to the lower support member.

In some exemplary embodiments, the lens driving device may further comprise: a base supporting the housing at a lower side; and a cover member accommodating the bobbin and the housing at an inner side of the cover member, wherein the support member may be spaced apart from the cover member.

In some exemplary embodiments, the lens driving device may further include: a third driving portion disposed between the housing and the base, and selectively moving the second driving portion through an electromagnetic interaction with the second driving portion.

In still another general aspect, there is provided a camera module, the camera module comprising: a lens module; a first driver including a first driving portion, and a bobbin, where the first driving portion is disposed at an outer circumferential surface of the bobbin and the lens module is coupled to an inner circumferential surface of the bobbin; a second driver disposed at an outer side of the first driver, and including a second driving portion disposed facing the first driver and a housing disposed with the second driving portion; and a support member movably supporting the bobbin with respect to the housing, wherein the bobbin may include a drive coupling portion disposed at an outer circumferential surface and disposed with the first driving portion, and a support portion extended from the drive coupling portion and supporting the first driving portion, and wherein the support member may include a plurality of support bodies disposed spaced apart from one another along an outer circumferential surface of the bobbin, and the support member may be disposed between the plurality of support bodies.

In still another general aspect, there is provided an optical apparatus, the optical apparatus comprising: a main body; a display unit arranged at a surface of the main body and displaying information; and a camera module installed at the main body and photographing an image or a picture, wherein the camera module may comprise: a lens module; a first driver including a first driving portion, and a bobbin, where the first driving portion is disposed at an outer circumferential surface of the bobbin and the lens module is coupled to an inner circumferential surface of the bobbin; a second driver disposed at an outer side of the first driver, and including a second driving portion disposed facing the first driver and a housing disposed with the second driving portion; and a support member movably supporting the bobbin with respect to the housing, wherein the bobbin may include a drive coupling portion disposed at an outer circumferential surface and disposed with the first driving portion, and a support portion extended from the drive coupling portion and supporting the first driving portion, and wherein the support member may include a plurality of support bodies disposed spaced apart from one another along an outer circumferential surface of the bobbin, and the support member may be disposed between the plurality of support bodies.

Advantageous Effect

Some exemplary embodiments of the present disclosure can minimize the oscillation phenomenon that may occur during the auto focus feedback control.

Some exemplary embodiments of the present disclosure can secure performance of AF or OIS function, and can inhibit an oscillation phenomenon at a resonance point as well.

DETAILED DESCRIPTION

Figure 1:
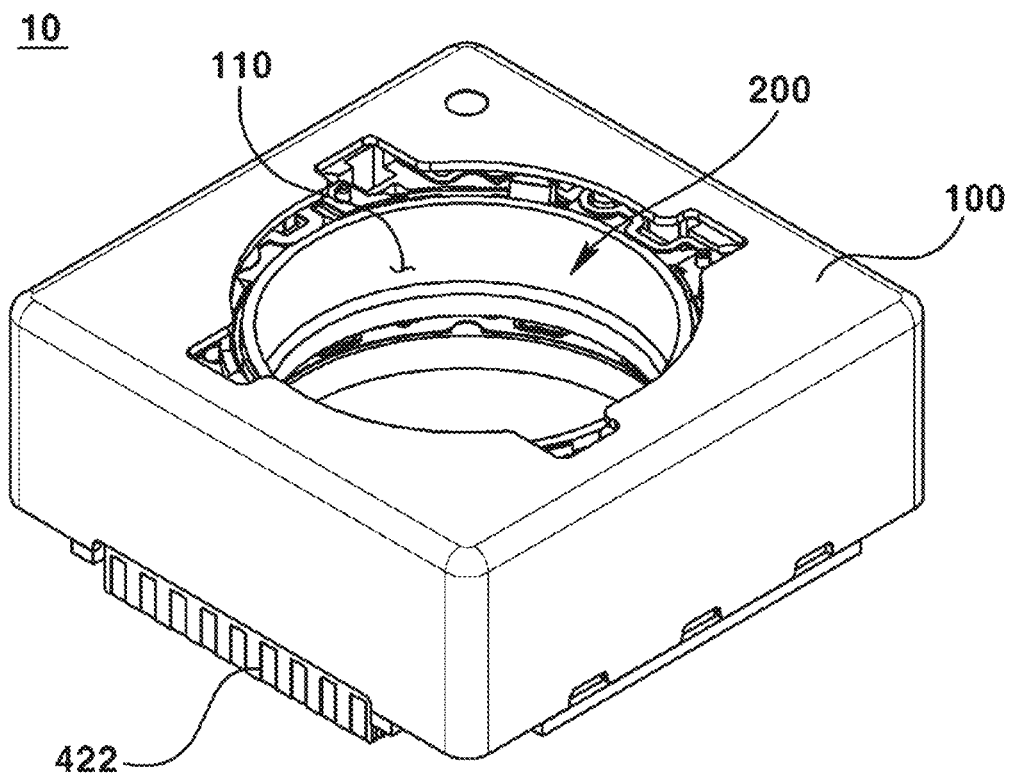
FIG. 1 is a perspective view illustrating a lens driving device according to a first exemplary embodiment of the present disclosure.

Hereinafter, exemplary embodiments of the present disclosure will be described with reference to the exemplary drawings. In designating elements in the drawings as reference numerals, wherever possible, the same reference numerals are used to refer to the same element, even though the same elements are illustrated in different drawings. In addition, in describing exemplary embodiments of the present disclosure, when it is determined that a detailed description about known function or structure relating to the present disclosure may disturb understanding of exemplary embodiments of the present disclosure, the detailed description may be omitted.

In addition, in describing elements of exemplary embodiments of the present disclosure, the terms such as "first", "second" "A", "B", "(a)" and "(b)" may be used. However, such terms are used merely to distinguish a particular element from another element, and therefore, essence, order or sequence of the relevant elements shall not be limited by the terms. It will be understood that when an element is referred to as being "connected", "contacted" or "coupled" to another element, it can be directly connected, contacted or coupled to the other elements, or otherwise, an intervening elements may be "connected", "contacted" or "coupled" between the element and the other element.

As used herein, the term "optical axis direction" is defined as a direction of an optical axis of a lens module installed at a lens actuator. Meanwhile, the term "optical axis direction" may be used in combination with the terms such as "up/down direction", "z-axis direction", etc.

As used herein, the term "auto focus function" is defined as a function to focus on the subject by moving the lens module in the optical axis direction according to distance to the subject to adjust the distance between an image sensor and the subject, in order to form a clear image on the image sensor. Meanwhile, the term "auto focus" may be used in combination with the term "AF (Auto Focus)".

As used herein, the term "handshake compensation function" is defined as a function to move or tilt the camera module in a direction perpendicular to the optical axis direction so as to counterbalance trembling (motion) generated by the image sensor due to external force. Meanwhile, the term "handshake compensation" may be used in combination with the term "OIS (Optical Image Stabilization)".

Hereinafter, a direction tending toward a center of the lens driving device may be referred to as an "inner" direction, and a direction departing from the center of the lens driving device may be referred to as an "outer" direction.

Hereinafter, a structure of an optical apparatus according to a first exemplary embodiment of the present disclosure will be described.

An optical apparatus according to an exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to a first exemplary embodiment of the present disclosure may include a main body (not illustrated), a display unit (not illustrated) arranged at a surface of the main body and displaying information, and a camera (not illustrated) including a camera module installed at the main body and photographing an image or a picture.

Hereinafter, a structure of the camera module will be described.

The camera module may further include a lens driving device (10), a PCB (Printed Circuit Board) (not illustrated), and an image sensor (not illustrated).

The lens driving device (10) may be coupled to an upper surface of the PCB. Meanwhile, an image sensor may be mounted on an upper surface of the PCB.

In addition, the camera module may further include an infrared cut-off filter (not illustrated). The infrared cut-off filter may block light in an infrared area from being incident on the image sensor. The infrared cut-off filter may be installed at a base (500) to be described hereinafter. The infrared cut-off filter may be coupled to a holder member (not illustrated). The infrared cut-off filter may be installed at a center hole (510) formed on a center portion of the base (500). As an exemplary embodiment, the infrared cut-off filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

In addition, the camera module may further include a lens module coupled to the lens driving device (10). Through such structure, the light that has passed through the lens module installed at the lens driving device (10) may be irradiated to the image sensor. The lens module may include at least one lens (not illustrated) and a lens barrel accommodating the at least one lens. However, one structure of the lens module is not limited to the lens barrel, but any kind of holder structure capable of supporting the at least one lens may be available.

Hereinafter, a structure of the lens driving device (10) will be described with reference to the enclosed drawings.

Figure 2:
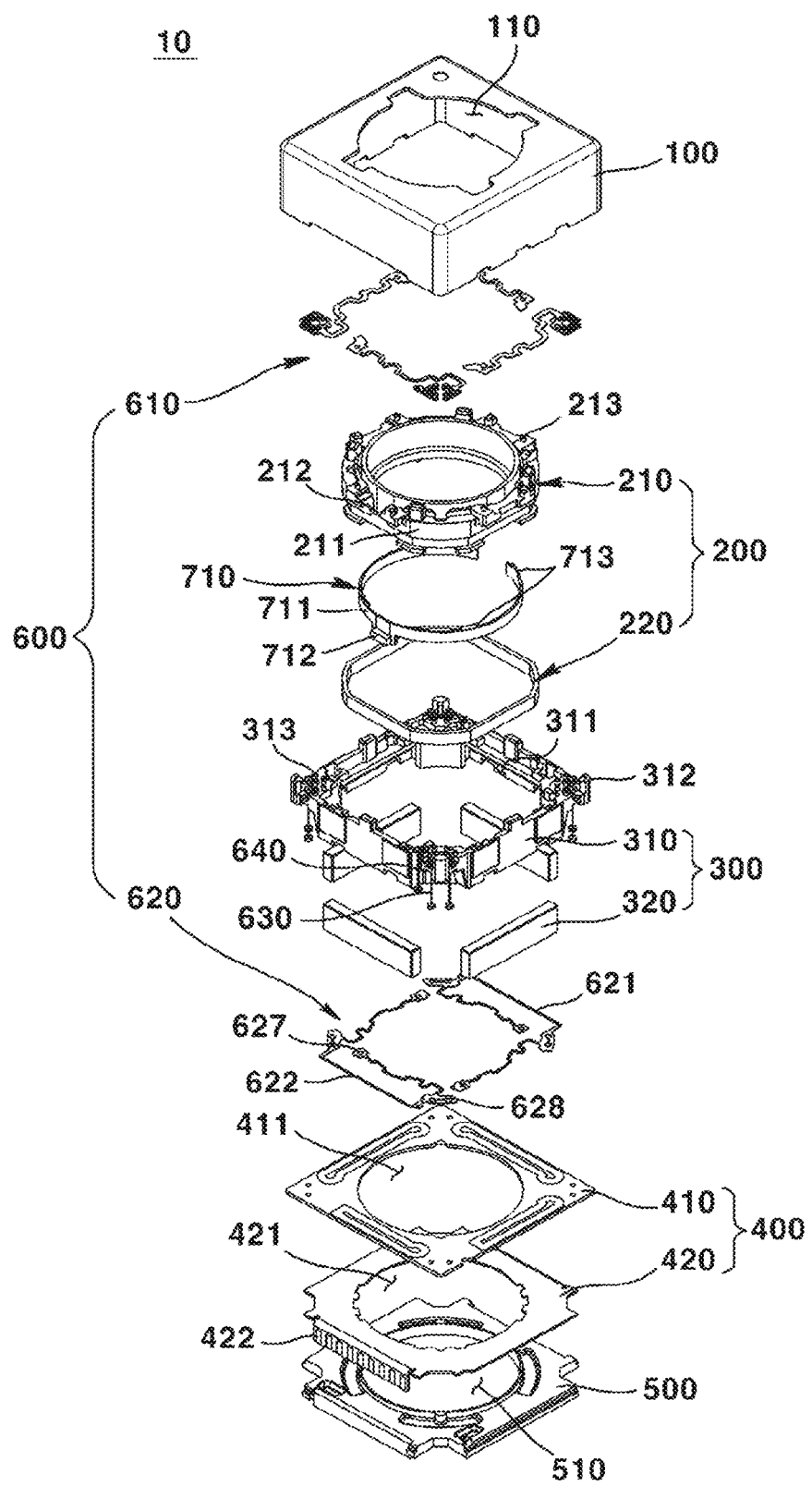
FIG. 2 is an exploded perspective view according to a first exemplary embodiment of the present disclosure.

FIG. 1 is a perspective view illustrating a lens driving device according to a first exemplary embodiment of the present disclosure, and FIG. 2 is an exploded perspective view according to a first exemplary embodiment of the present disclosure.

Referring FIG. 1, the lens driving device (10) according to a first exemplary embodiment of the present disclosure may include a cover can (100), a first driver (200), a second driver (300), a stator (400), a base (500), a support member (600), and a sensor portion (700). Alternatively, the lens driving device (10) according to a first exemplary embodiment of the present disclosure may omit at least one of the cover can (100), the first driver (200), the second driver (300), the stator (400), the base (500), the support member (600), and the sensor portion (700).

The cover can (100) may form an external appearance of the lens driving device (10). For example, the cover can (100) may be formed in a shape of a hexahedron of which lower portion is opened, but not limited hereto. Meanwhile, the cover can (100) may be installed at an upper portion of the base (500). The first driver (200), the second driver (300), the stator (400), and the support member (600) may be disposed at an internal space formed by the cover can (100) and the base (500). In addition, the cover can (100) may be coupled to the base (500) with an inner lateral surface of the cover can (100) closely adhered to a part or a whole of a lateral surface of the base (500). The cover can (100) may protect internal components from external impacts and inhibit penetration of external pollutants as well.

The cover can (100) may be formed of metallic material. In this case, the cover can (100) may function to protect components of the camera module from external electronic interference generated by devices such as mobile phones. However, the material forming the cover can (100) is not limited hereto.

The cover can (100) may include an opening (110) formed on an upper surface and exposing the lens module (not illustrated). That is, the light incident through the opening (110) may be delivered to the image sensor (not illustrated) through the lens module.

The first driver (200) may include a bobbin (210) and a first driving portion (220). The bobbin (210) of the first driver (200) may be coupled to a lens module that is a component of a camera module. That is, the lens module may be disposed at an inner side of the first driver (200). In other words, an inner circumferential surface of the first driver (200) may be couple to an outer circumferential surface of the lens module. Meanwhile, the first driver (200) may float integrally with the lens module through an interaction with a second driver or a stator (400). That is, the first driver (200) may move the lens module.

The first driver (200) may include a bobbin (210). In addition, the first driver (200) may include a first driving portion (220) coupled to the bobbin (210).

The bobbin (210) may be coupled to the lens module. In particular, an outer circumferential surface of the lens module may be coupled to an inner circumferential surface of the bobbin (210). Meanwhile, the first driving portion (220) may be coupled to the bobbin (210). In addition, a lower portion of the bobbin (210) may be coupled to a lower support member (620), and an upper portion of the bobbin (210) may be coupled to an upper support member (610). The bobbin (210) may float relative to the housing (310).

The bobbin (210) may include a first guide portion (211) guiding the first driving portion (220) to be wound or installed. The first guide portion (211) may be integrally formed with an outer lateral surface of the bobbin (210). In addition, the first guide portion (211) may be continuously formed along an outer circumferential surface of the bobbin (210), or may be formed be being spaced apart at a predetermined interval.

The bobbin (210) may include a second guide portion (212) guiding a second guide portion (212) guiding a first sensor portion (710) to be mounted. The second guide portion (212) may be integrally formed with an outer lateral surface of the bobbin (210). In addition, the second guide portion (212) may be integrally formed with an outer lateral surface of the bobbin (210). In addition, the second guide portion (212) may be provided as an accommodating groove such that a sensor fixing portion (711) of can be inserted in the accommodating groove.

The bobbin (210) may include a coupling protrusion (213) coupled to an upper support member (610). The coupling protrusion (213) may be coupled by being inserted in a first coupling groove (617) of the upper support member (610). Meanwhile, a protrusion may be provided at the upper support member (610) and a groove may be formed at the bobbin (210), and these two components may be couple to each other.

As illustrated in FIG. 2, the bobbin (210) may include total four coupling grooves (213), where each of the coupling grooves (213) may be coupled to each of the upper support member (610) separately provided. Meanwhile, the bobbin (210) may include a coupling groove (not illustrated) coupled to the lower support member (620). The coupling groove formed at the lower portion of the bobbin (210) may be coupled by being inserted in a first coupling groove (627) of the lower support member (620).

The first driving portion (220) may be disposed facing to a second driving portion (320) of the second driver (320). The first driving portion (220) may move the bobbin (210) with respect to the housing (310), through electromagnetic interaction with the second driving portion (320). The first driving portion (220) may include a coil. The coil may be wound on an outer lateral surface of the bobbin (210), by being guided by the first guide portion (211).

In addition, the coil may include four independent coils, of which two adjacent coils may form a 90 degree angle to be arranged at an outer lateral surface of the bobbin (210). In a case where the first driving portion (220) includes a coil, the electric power supplied to the coil may be supplied through the lower support member (620). Meanwhile, an electromagnetic field may be formed around the coil. In addition, the first driving portion (220) may include a magnet. In such case, the second driver (320) may be provided as a coil.

The second driver (300) may be disposed at an outer side of the first driver (200) by facing the first driver (200).

The second driver (300) may include a housing (310) disposed at an outer side of the bobbin (210). In addition, the second driver (300) may include a second driving portion (320) that is disposed facing the first driving portion (220) and fixed to the housing (310).

The housing (310) may be formed in shape corresponding to an inner lateral surface of the cover can (100) forming an external appearance of the lens driving device (10). In addition, the housing (310) may be formed of an insulated material, and may be implemented as an injection molding material, in consideration of productivity. The housing (310) may be arranged to be spaced apart at a predetermined distance from the cover can (100), as a movable component for OIS (Optical Image Stabilization) operation.

In addition, upper and lower sides of the housing (310) may be opened to accommodate the first driver (200) movable up/downward. In addition, the housing (310) may include, at a lateral surface thereof, a driver accommodating portion (311) formed in a shape corresponding to that of the second driving portion (320) to accommodate the second driving portion (320). That is, the driver accommodating portion (311) may fix the second driving portion (320) by accommodating the second driving portion (320). Meanwhile, the driver accommodating portion (311) may be disposed on an inner circumferential surface or on an outer circumferential surface of the housing (310).

The housing (310) may include a stopper (312). The stopper (312) may be protrusively formed, and may absorb impacts by contacting a lower side of an upper surface of the cover can (2100) when an external shock occurs. As illustrated in FIG. 2, each of the stoppers (312) may be provided at each of four angular points, but not limited hereto. Meanwhile, the stopper (312) may be integrally formed with the housing (310).

The upper support member (610) may be coupled to an upper portion of the housing (310), and the lower support member (620) may be coupled to a lower portion of the housing (310). The housing (310) may include a coupling groove (323) coupled to the upper support member (610). The coupling groove (323) may be coupled by being inserted in a second coupling groove (618) of the upper support member (610).

Meanwhile, a protrusion may be provided at the upper support member (610) and a groove may be provided at the housing (310), and these two components may be coupled to each other. As illustrated in FIG. 2, the housing (310) may include a plurality of coupling protrusions (313). Meanwhile, the housing (310) may include a coupling protrusion (not illustrated) coupled to the lower support member (620). The coupling protrusion formed at the lower portion of the housing (310) may be coupled by being inserted in the second coupling groove (618) of the lower support member (620).

The second driving portion (320) may be disposed facing to the first driving portion (320) of the first driver (200). The second driving portion (320) may move the first driving portion (220) through electromagnetic interaction with the first driving portion (220). The second driving portion (320) may include a magnet. The magnet may be fixed at the driver accommodating portion (311) of the housing (310).

According to an exemplary embodiment of the present disclosure, as illustrated in FIG. 2, four independent magnets may be independently provided and arranged at the housing (310), where two adjacent magnets may form a 90 degree angle with each other. That is, the second driving portion (320) may be arranged at four edges inside of the housing (310) at a same interval, aiming to efficient use of internal volume. In addition, the second driving portion (320) may adhere to the housing (310) using such as an adhesive, but not limited hereto. In addition, the first driving portion (220) may include a magnet, and the second driving portion (320) may be provided as a coil.

The stator (400) may be disposed facing to a lower side of the second driver (300). Meanwhile, the stator (400) may move the second driver (300). In addition, penetrating holes (411, 421) corresponding to the lens module may be disposed at a center of the stator (400).

The stator (400) may include a third driving portion (410) disposed facing to a lower side of the second driving portion (320). In addition, the stator (400) may include an FPCB (Flexible Printed Circuit Board) (420) disposed between the third driving portion (410) and the base (500).

The third driving portion (410) may include a coil. In such case, the housing (310) fixed with the second driving portion (320) may float by interaction with the second driving portion (320), when electric power is applied to a coil of the third driving portion (410). The third driving portion (410) may be mounted on the FPCB (420) or may be electrically connected to the FPCB (420). Meanwhile, the third driving portion (410) may include a penetrating hole (411) in the center thereof. In addition, the third driving portion (410) may be formed as an FP (Fine Pattern) coil to be arranged at the FPCB (420), in consideration of miniaturization (lowering the height in z-axis direction that is an optical axis direction) of the lens driving device (10).

The FPCB (420) may be disposed between the third driving portion (420) and the base (500). Meanwhile, the FPCB (420) may supply electric power to the third driving portion (420). In addition, the FPCB (420) may supply electric power to the first sensor portion (710) through the upper support member (610). In addition, the FPCB (420) may supply electric power to the first driving portion (220) through the lateral support member (630), the upper support member (610), the connecting member (640), and the lower support member (620).

The FPCB (420) may include a penetrating hole (421) at a position corresponding to that of the penetrating hole (411) of the second coil portion (410). In addition, the FPCB (420) may include a terminal portion (422) that is bent to be exposed to the outside. The terminal portion (422) may be connected to an external electric power source, such that the FPCB (420) can be supplied with electric power.

The base (500) may support the stator (400). The base (500) may support the second driver (300). The PCB (not illustrated) may be disposed at a lower side of the base (500). The base (500) may include a center hole (510) formed at a position corresponding to that of the penetrating hole (411, 421) of the stator (400). The base (500) may function as a sensor holder protecting the image sensor (not illustrated). Meanwhile, the base (500) may be provided in order to dispose an infrared ray filter (not illustrated). That is, the infrared ray filter may be coupled to the center hole (510) of the base (500).

The infrared ray filter may be installed at a center hole (510) formed on a center portion of the base (500). As an exemplary embodiment, the infrared ray filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

According to an exemplary embodiment of the present disclosure, the base (500) may include a foreign material collecting portion (not illustrated) for collecting foreign materials introduced in the cover can (100). Meanwhile, the base (500) may further include a sensor accommodating groove (not illustrated) accommodating the second sensor portion (720).

The support member (600) may connect the first driver (200) and the second driver (300). The support member (600) may elastically connect the first driver (200) and the second driver (300) such that the first driver (200) can relatively float with respect to the second driver (300). That is, the support member (600) may be provided as an elastic member. As an example, as illustrated in FIG. 2, the support member (600) may include the upper elastic member (610), the lower elastic member (620), the lateral elastic member (630), and the connecting member (640).

The upper elastic member (610) may be connected to an upper portion of the first driver (200) and to an upper portion of the second driver (300). In particular, the upper elastic member (610) may be coupled to an upper portion of the bobbin (210) and to an upper portion of the housing (310). The coupling protrusion (213) of the bobbin (210) may be inserted in the first coupling groove (617) of the upper support member (610), and the coupling protrusion (313) of the housing (310) may be inserted in the second coupling groove (618) of the upper support member (610).

According to an exemplary embodiment of the present disclosure, the upper support member (610) may be divided in six pieces. That is, the upper support member (610) may include a first support member (611), a second support member (612), a third support member (613), a fourth support member (614), a fifth support member (615), and a sixth support member (616). Here, two of the totally six divided pieces of the upper support member (610) may be used to apply electric power to the first driving portion (220), and the rest four pieces may be used to apply electric power to the first sensor portion (710) and to input/output information between the controller and the first sensor portion (710).

The lower support member (620) may be connected to a lower portion of the first driver (200) and to a lower portion of the second driver (300). In particular, the lower support member (620) may be coupled to a lower portion of the bobbin (210) and to a lower portion of the housing (310). A lower coupling protrusion of the bobbin (210) may be inserted in the first coupling groove (627), and the lateral support member (630) coupled to the housing (310) may be inserted in the second coupling groove (628).

According to an exemplary embodiment of the present disclosure, the lower support member (620) may be provided by being divided into two pieces. Here, the lower support member (620) divided into two pieces may be electrically connected to two of the upper support member (610) divided into six pieces, through the connecting member (640). In this case, the lower support member (620) may supply electric power by being connected to the first driving portion (220).

An end of the lateral support member (630) may be fixed to the stator (400) or to the base (500), and another end of the lateral support member (630) may be coupled to the upper support member (610) or to the second driver (300). The lateral support member (630) may elastically support the second driver (300), such that the second driver (300) can be moved or tilted in a horizontal direction.

According to an exemplary embodiment of the present disclosure, the lateral support member (630) may be coupled to the upper support member (610) and may include a structure for absorbing impacts. The structure for absorbing impacts may be provided at at least one of the lateral support member (630) and the upper support member (610). The structure for absorbing impacts may be a separate member such as a damper. Alternatively, the structure for absorbing impacts may be implemented through shape modification at some part of at least one of the lateral support member (630) and the upper support member (610).

According to an exemplary embodiment of the present disclosure, the lateral support member (630) may be provided in the same number as the number in which the upper support member (610) is provided. That is, six of the lateral support member (630) may be provided and respectively connected to six of the upper support member (610). In this case, the lateral support member (630) may supply electric power supplied from the stator (400) to each of the upper support members (610). According to an exemplary embodiment of the present disclosure, the number of the lateral support member (630) may be determined in consideration of symmetry. According to an exemplary embodiment of the present disclosure, as illustrated in FIG. 2, totally eight of the lateral support member (630) may be provided, two pieces at each of edges of the housing (300).

The connecting member (640) may electrically connect the upper support member (610) and the lower support member (620). The connecting member (640) may be provided in separation from the lateral support member (630). Since electric power may be supplied to the lower support member (620) through the connecting member (640), the first driving portion (220) can be supplied with electric power through the lower support member (620).

The sensor portion (700) may be used for AF (Auto Focus) feedback and/or OIS (Optical Image stabilization) feedback. That is, the sensor portion (700) may detect a position and/or movement of the first driver (200) and/or the second driver (300). According to an exemplary embodiment of the present disclosure, the sensor portion (700) may include a first sensor portion (710) and/or a second sensor portion (720).

The first sensor portion (710) may be disposed at the first driver (200). In particular, the first sensor portion (710) may be disposed at the bobbin (210). The first sensor portion (710) may be fixed by being inserted in the second guide portion (212) formed on an outer circumferential surface of the bobbin (210).

According to an exemplary embodiment of the present disclosure, the first sensor portion (710) may include a sensor fixing portion (711), a sensor (712), and a terminal (713). As illustrated in FIG. 2, the sensor fixing portion (711) may be provided in shape of a band. At least a part of the sensor fixing portion (711) may be provided in shape corresponding to a shape of the second guide portion (212) of the bobbin (212), and may be inserted in the second guide portion (212).

According to an exemplary embodiment of the present disclosure, the sensor fixing portion (711) may be an FPCB (Flexible Printed Circuit Board). That is, the sensor fixing portion (711) may be provided flexible, and may be disposed to cover an outer circumferential surface of the bobbin (210). The sensor (712) may be fixed to the sensor fixing portion (711).

The sensor (712) may detect a position and/or movement of the bobbin (210). According to an exemplary embodiment of the present disclosure, the sensor (712) may be a Hall sensor. The sensor (712) may detect magnetic force generated from the second driving portion (320), and may sense a relative position between the bobbin (210) and the housing (300).

The terminal (713) may be formed at the sensor fixing portion (711). The terminal (713) may be supplied with electric power, and may supply the electric power to the sensor (712) through the sensor fixing portion (711). In addition, the terminal (713) may receive a control command with respect to the sensor (712), or may transmit a value sensed from the sensor (712). According to an exemplary embodiment of the present disclosure, four of the terminal (713) may be provided.

Meanwhile, the terminal (713) may be electrically connected with the upper support member (610). In this case, two of the four terminals (713) may be used to receive electric power, and the rest two of terminals (713) may be used to transmit/receive information. The first sensor portion (710) may sense a relative floating of the bobbin (210) with respect to the housing (310) in upward/downward directions, to provide information for the AF feedback.

The second sensor portion (720) may be disposed at the stator (400). The second sensor portion (720) may be disposed at an upper or a lower surface of the FPCB (420) of the stator (400). According to an exemplary embodiment of the present disclosure, the second sensor portion (720) may be disposed at a sensor accommodating groove (not illustrated) formed on the base (500).

According to an exemplary embodiment of the present disclosure, the second sensor portion (720) may include a Hall sensor. In this case, the second sensor portion (720) may sense relative floating of the second driver (300) with respect to the stator (400) by sensing magnetic field of the second driving portion (320) of the second driver (320). That is, the second sensor portion (720) may provide information of OIS feedback by sensing tilt or horizontal movement of the second driver (300).

Meanwhile, hereinafter, a support member of a camera module according to a first exemplary embodiment of the present disclosure will be described in detail with reference to FIGS. 3 and 4.

Figure 3:
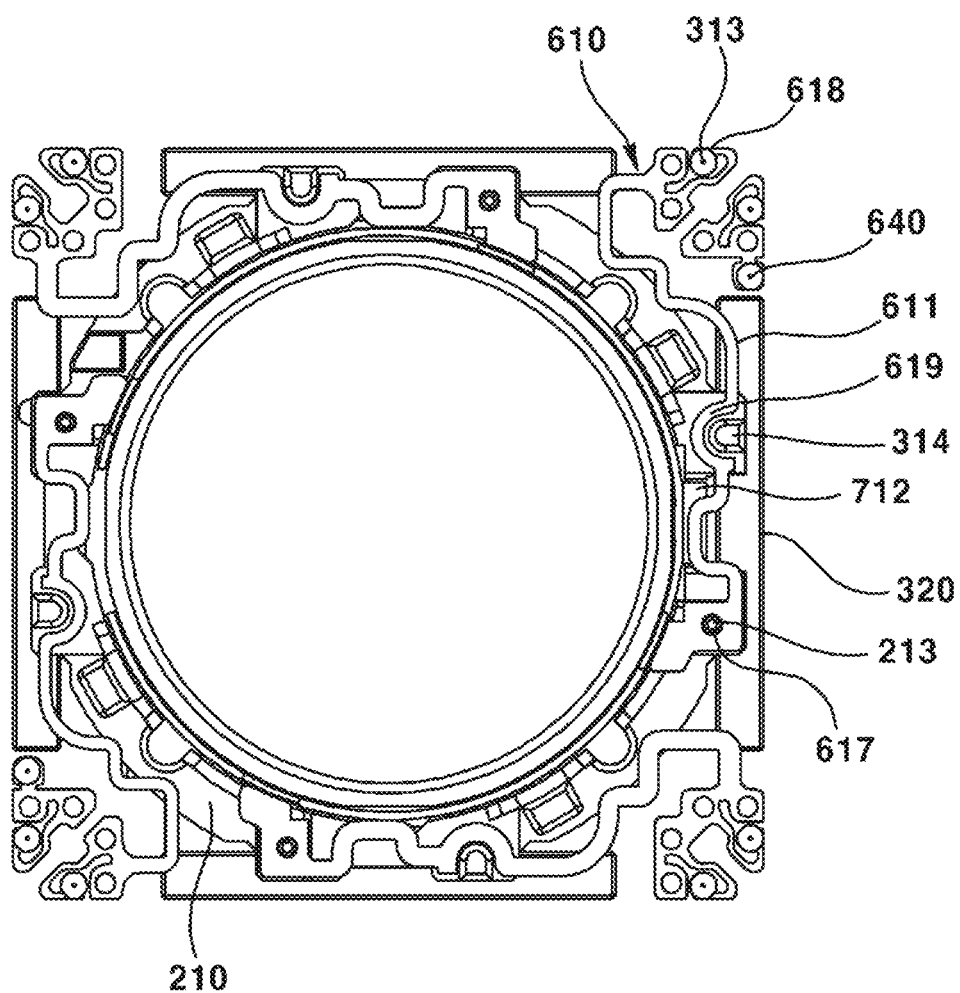
FIG. 3 is a plan view illustrating a partial component of a lens driving device according to an exemplary embodiment of the present disclosure.
Figure 4:
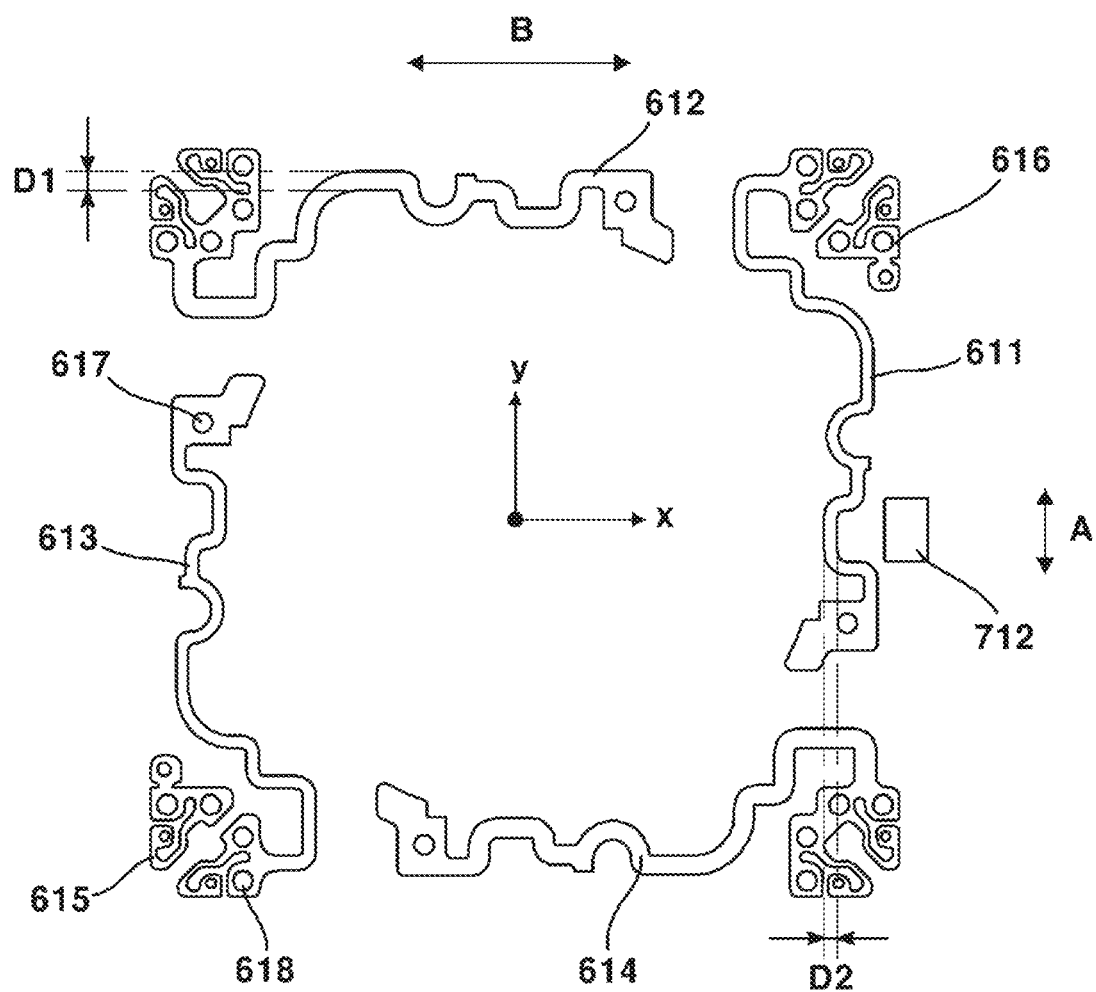
FIG. 4 is a plan view illustrating an upper support member of a lens driving device according to an exemplary embodiment of the present disclosure.

FIG. 3 is a plan view illustrating a partial component of a lens driving device according to an exemplary embodiment of the present disclosure, and FIG. 4 is a plan view illustrating an upper support member of a lens driving device according to an exemplary embodiment of the present disclosure.

Although the upper support member is illustrated as an exemplary embodiment in FIG. 4, the following descriptions may also be analogically applied to the lower support member. Therefore, in the description of FIG. 4, the upper support member and the lower support member may be commonly referred to as a support member.

Referring to FIG. 3, the upper support member (610) of the lens driving device (10) according to a first exemplary embodiment of the present disclosure may be coupled to an upper portion of the housing (310) and an upper portion of the bobbin (210). The upper support member (610) may elastically support the housing (310) and the bobbin (210), such that the bobbin (210) may relatively float with respect to the housing (310).

The upper support member (610) may include a first coupling groove (617) and a second coupling groove (618). The first coupling groove (617) may be coupled to the coupling protrusion (213) of the bobbin (210). The second coupling groove (618) may be coupled to the coupling protrusion (313) of the housing (320).

Meanwhile, the upper support member (610) may include a damper coating portion (619). The damper coating portion (619) may be provided in a shape corresponding to a shape of a damper guide (314). According to an exemplary embodiment of the present disclosure, the damper coating portion (619) may be provided in a semicircular shape, and at least a part of the damper coating portion (619) may accommodate a damper guide (314), where at least a part of the damper coating portion (619) may be protruded in a cylindrical shape. A damper (not illustrated) may be coated between the damper coating portion (619) and the damper guide (314).

The damper coated between the damper coating portion (619) and the damper guide (314) may change frequency characteristic of the upper support member (610). That is, the damper may be coated in order to minimize resonance of the support member (600). In addition, the damper (not illustrated) may additionally coated at other positions than between the upper support member (610) and the housing (310). According to an exemplary embodiment of the present disclosure, the damper may be coated between the housing (310) and the base (500).

Referring to FIG. 4, the upper support member (610) of the lens driving device (10) according to a first exemplary embodiment of the present disclosure may include a first support unit (611) and a third support unit (613) that are disposed in a virtual y-axis direction and facing each other, and a second support unit (612) and a fourth support unit (614) that are disposed in a virtual x-axis direction and facing each other.

That is, the support member (610) may include: a first support unit (611) and a third support unit (613) disposed in a first direction and facing each other; and a second support unit (612) and a fourth support unit (614) disposed in a second direction perpendicular to the first direction and facing each other. Therefore, the first support unit (611) and the third support unit (613) may be disposed perpendicular to the second support unit (612) and the fourth support unit (614).

Meanwhile, the sensor (712) a relative position of the bobbin (210) and the housing (310) may be disposed mostly adjacent to the first support unit (611) among the first to the fourth support units (611, 612, 613, 164).

Here, an elastic modulus of the first support unit (611) and the third support unit (613) may be lower than an elastic modulus of the second support unit (612) and the fourth support unit (614). In particular, a thickness of the first support unit (611) and the third support unit (613) may be thinner than a thickness of the second support unit (612) and the fourth support unit (614). Here, the thickness refers to a length in upward/downward directions.

Meanwhile, a width (see D2 in FIG. 4) of the first support unit (611) and the third support unit (613) may be narrower than a width (see D1 in FIG. 4) of the second support unit (612) and the fourth support unit (614). Here, the thickness refers to a length in upward/downward directions.

In addition, a length of the first support unit (611) and the third support unit (613) may be longer than a length of the second support unit (612) and the fourth support unit (614). Alternatively, a length of the first support unit (611) and the third support unit (613) may be shorter than a length of the second support unit (612) and the fourth support unit (614). That is, an elastic modulus of the support member (600) may be adjusted by thickness, width, length, and shape of the support member (600).

In addition, a y-axis elastic modulus of the first support unit (611) and the third support unit (613) may be smaller than an x-axis elastic modulus of the second support unit (612) and the fourth support unit (614). In other words, it may be described that an elastic modulus in a second direction of the support member (600) is greater than an elastic modulus in a first direction of the support member (600). In this case, a tilt amount in y-axis direction (see A in FIG. 4) may be smaller than a tilt amount in x-axis direction (see B in FIG. 4). That is, the tilt amount (A) sensed by the sensor (712) may be reduced. When the tilt amount (A) sensed by the sensor (712) is reduced in this wise, the possibility of oscillation may also be reduced. This will hereinafter be described in detail.

The support member (600) may include: an upper support member (610) connecting an upper portion of the housing (310) and an upper portion of the bobbin (210); and a lower support member (620) connecting a lower portion of the housing (310) and a lower portion of the bobbin (210).

Here, the sensor (712) sensing a relative position of the bobbin (210) and the housing (31) may be disposed adjacent to any one of the upper support member (610) and the lower support member (620). In this case, the upper support member (610) or the lower support member (620), to which the sensor (712) is disposed more adjacent, may have an elastic modulus greater than an elastic modulus of the other support member.

That is, an elastic modulus of the upper support member (610) may be greater than an elastic modulus of the lower support member (620), when the sensor (712) is disposed closer the upper elastic member (610). Alternatively, an elastic modulus of the lower support member (620) may be greater than an elastic modulus of the upper support member (610), when the sensor (712) is disposed closer the lower elastic member (620).

Hereinafter, an upper support member according to a modified exemplary embodiment of the first exemplary embodiment of the present disclosure will be described in detail with reference to FIG. 5.

Figure 5:
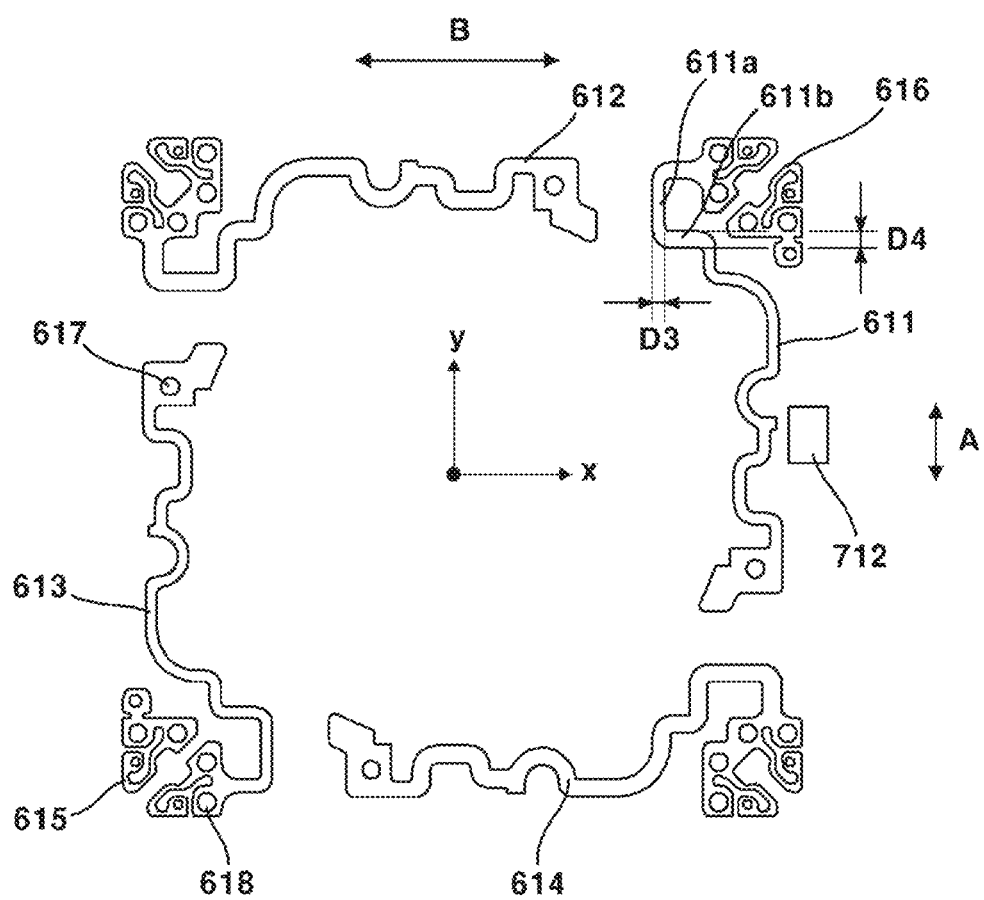
FIG. 5 is a plan view illustrating an upper support member of a lens driving device according to a modified exemplary embodiment of the first exemplary embodiment of the present disclosure.

FIG. 5 is a plan view illustrating an upper support member of a lens driving device according to a modified exemplary embodiment of the first exemplary embodiment of the present disclosure.

The previous description for the upper support member (610) of the lens driving device (10) according to a first exemplary embodiment of the present disclosure may be analogically applied to the upper support member (610) of the lens driving device (10) according to a modified exemplary embodiment of the present disclosure. The following description will be given mainly focusing on a difference between the first exemplary embodiment and the modified exemplary embodiment of the present disclosure.

Referring to FIG. 5, the upper support member (610) of the lens driving device (10) according to the modified exemplary embodiment of the first exemplary embodiment of the present disclosure may include a first support unit (611) and a third support unit (613) that are disposed in a virtual y-axis direction and facing each other, and a second support unit (612) and a fourth support unit (614) that are disposed in a virtual x-axis direction and facing each other.

That is, the support member (610) may include: a first support unit (611) and a third support unit (613) disposed in a first direction and facing each other; and a second support unit (612) and a fourth support unit (614) disposed in a second direction perpendicular to the first direction and facing each other.

The first support unit (611) may include a first support portion (611*a*) disposed closer to a y-axis direction than to an x-axis direction, and a second support portion (611*b*) disposed closer to the x-axis direction than to the y-axis direction. In other words, the first support unit (611) may include a first support portion (611*a*) disposed closer to a first direction than to a second direction, and a second support portion (611*b*) disposed closer to the second direction than to the first direction.

Here, an elastic modulus of the first support portion (611*a*) may be smaller than an elastic modulus of the second support portion (611*b*). In particular, a width (see D3 in FIG. 5) of the first support portion (611*a*) may be narrower than a width (see D4 in FIG. 5) of the second support portion (611*b*). Of course, the elastic modulus of the first support portion (611*a*) and the second support portion (611*b*) may be modified by thickness, width, length, and shape of the first support portion (611*a*) and the second support portion (611*b*).

In this case, as also described in the previous exemplary embodiment, a tilt amount in y-axis direction (see A in FIG. 5) may be smaller than a tilt amount in x-axis direction (see B in FIG. 5). That is, the tilt amount (A) sensed by the sensor (712) may be reduced. When the tilt amount (A) sensed by the sensor (712) is reduced in this wise, the possibility of oscillation may also be reduced.

Meanwhile, unlike the previous exemplary embodiment, when the elastic modulus of the first support portion (611*a*) is smaller than the elastic modulus of the second support portion (611*b*), the tilt amount (A) in y-axis direction may further reduced in comparison with the previous exemplary embodiment, which is an advantage of the modified exemplary embodiment.

Hereinafter, an operation of the camera module according to a first exemplary embodiment of the present disclosure will be described in detail with reference to the drawings.

The lens driving device (10) according to the first exemplary embodiment of the present disclosure may be supplied with external electric power from the terminal portion (422) of the FPCB (420) exposed outside of the cover can (100). Meanwhile, the electric power supplied to the FPCB (420) may be supplied to a coil that is a third driver (410) electrically connected to the FPCB (420).

In this case, the first driver (200) and the second driver (300) may be moved or tilted in horizontal directions by electromagnetic interaction between the coil that is the third driver (410) and the magnet that is the second driving portion (320), such that the OIS function can be performed. Here, the housing (320) may be elastically supported by the lateral support member (630) with respect to the base (500) or to the FPCB (420).

In addition, the electric power supplied to the FPCB (420) may be supplied to the upper support member (610) through the lateral support member (630). At least six lateral support member (630) may respectively supply electric power to each of the first to six support units (611, 612, 613, 614, 615, 616) separately provided in six pieces. The first to fourth support units (611, 612, 613, 614) may be connected to the terminal (730) of the first sensor portion (710) to supply electric power to the sensor (712) and to receive/transmit information.

Meanwhile, the fifth support unit (615) and the sixth support unit (616) may be electrically connected to the lower support member (620) through the connecting member (640). In this case, the lower support member (620) may include a first lower support unit (621) and a second lower support unit (622). Here, the fifth support unit (615) may be connected to the first lower support unit (621), and the sixth support unit (616) may be connected to the second lower support unit (622).

Meanwhile, the first lower support unit (621) and the second lower support unit (622) may supply electric power to the coil that is the first driving portion (220). In this wise, when the electric power is supplied to the coil that is the first driving portion (220), the first driver (200) may be moved in upward/downward directions (vertical directions) with respect to the second driver (300) by electromagnetic interaction with the magnet that is the second driving portion (320), such that the AF function can be performed.

Meanwhile, when the first driver (200) is moved in upward/downward directions with respect to the second driver (300) to perform the AF function in this wise, the first sensor portion (710) provided at the first driver (200) may sense a position of the first driver (200) or a relative movement of the first driver (200) with respect to the second driver (300).

The value sensed by the first sensor portion (710) may be processed by the controller to be used for the auto focus feedback. There has been a problem in the conventional art in that the support member (600) oscillates when an impact corresponding to a second resonance frequency of the support member (600) is applied to the support member (600).

On the contrary, as described in the foregoing, the lens driving according to the first exemplary embodiment of the present disclosure can minimize possibility of occurrence of oscillation by reducing tilt amount sensed by the first sensor portion (710), even when an impact is applied to the support member (600).

Hereinafter, a structure of an optical apparatus according to a second exemplary embodiment of the present disclosure will be described.

The optical apparatus according to a second exemplary embodiment of the present disclosure may be any one of a mobile phone, a smart phone, a portable smart device, a digital camera, a laptop computer, a digital broadcasting device, a PDA (Personal Digital Assistant), a PMP (Portable Multimedia Player), and a navigation device, but not limited hereto. Thus, any kind of device to photograph a picture or motion picture may be the optical apparatus.

The optical apparatus according to a second exemplary embodiment of the present disclosure may include a main body (not illustrated in the drawings), a display unit (not illustrated in the drawings) configured to display information by being arranged at a surface of the main body, and a camera (not illustrated in the drawings) having a camera module (not illustrated in the drawings) configured to photograph a picture or motion picture by being installed at the main body.

Hereinafter, a structure of the camera module will be described.

The camera module may include a lens driving device (not illustrated), a lens module (not illustrated), an infrared cut-off filter (not illustrated), a PCB (Printed Circuit Board) (not illustrated), an image sensor (not illustrated), and a controller (not illustrated).

The lens module may include at least one lens (not illustrated in the drawings) and a lens barrel accommodating the at least one lens. However, one structure of the lens module is not limited to the lens barrel, but any kind of holder structure capable of supporting the at least one lens may be available. The lens module may move along with a lens driving device (1010) by being coupled to the lens driving device (1010). As an example, the lens module may be screw-coupled to the lens driving device (1010). As another example, the lens module may be coupled to the lens driving device (1010) using an adhesive (not illustrated). As still another example, the lens module may be coupled to an inner side of the lens driving device (1010). Meanwhile, light that has passed through the lens module may be irradiated to an image sensor.

The infrared cut-off filter may block light in an infrared area from being incident on the image sensor. As an example, the infrared cut-off filter may be disposed between the lens module and the image sensor. The infrared cut-off filter may be installed at a base (1500) to be described hereinafter. The infrared cut-off filter may be coupled to a holder member (not illustrated). The infrared cut-off filter may be installed at a center hole (1510) formed on a center portion of the base (1500). As an exemplary embodiment, the infrared cut-off filter may be formed of a film material or a glass material. Meanwhile, as an exemplary embodiment, the infrared cut-off filter may be formed by a process where a kind of infrared cut-off coating material is coated on a flat optical filter such as a cover glass for image plane protection.

The PCB (Printed Circuit Board) may support the lens driving device (1010). The image sensor may be mounted on the PCB. As an example, the lens driving device (1010) may be disposed at an outer side of an upper surface of the PCB, and the image sensor may be disposed at an external side of an upper surface of the PCB. The lens driving device may be disposed at an upper side of the sensor holder. Through such structure, the light that has passed through the lens module coupled at an inner side of the lens actuating unit may be irradiated to the image sensor mounted on the printed circuit board. The PCB may supply electric power to the lens driving device (1010). Meanwhile, a controller for controlling the lens driving device (1010) may be disposed at the printed circuit board.

The image sensor may be mounted on the PCB. The image sensor may be disposed to have the same optical axis with the lens module. Through such structure, the image sensor may obtain the light that has passed through the lens module. The image sensor may output the irradiated light as a picture. As an example, the image sensor may be any one of a CCD (charge coupled device), an MOS (metal oxide semi-conductor), a CPD (charge priming device) and a CID (charge injection device), but not limited hereto.

The controller may be mounted on the printed circuit board. The controller may be disposed at an external side of the lens driving device (1010). Alternatively, controller may be disposed at an internal side of the lens driving device (1010). The controller may control direction, intensity and amplitude of electrical current supplied to each structural element forming the lens driving device (1010). The controller may control the lens driving device (1010) to perform at least any one of auto focus function or handshake compensation function of the camera module. That is, the controller may control the lens driving device to move the lens module in an optical axis direction or in a direction perpendicular to the optical axis direction, or to tilt the lens module. Furthermore, the controller may perform feedback control of the auto focusing function and the handshake compensation function.

Hereinafter, a structure of the lens driving device (1010) will be described with reference to the enclosed drawings.

Figure 6:
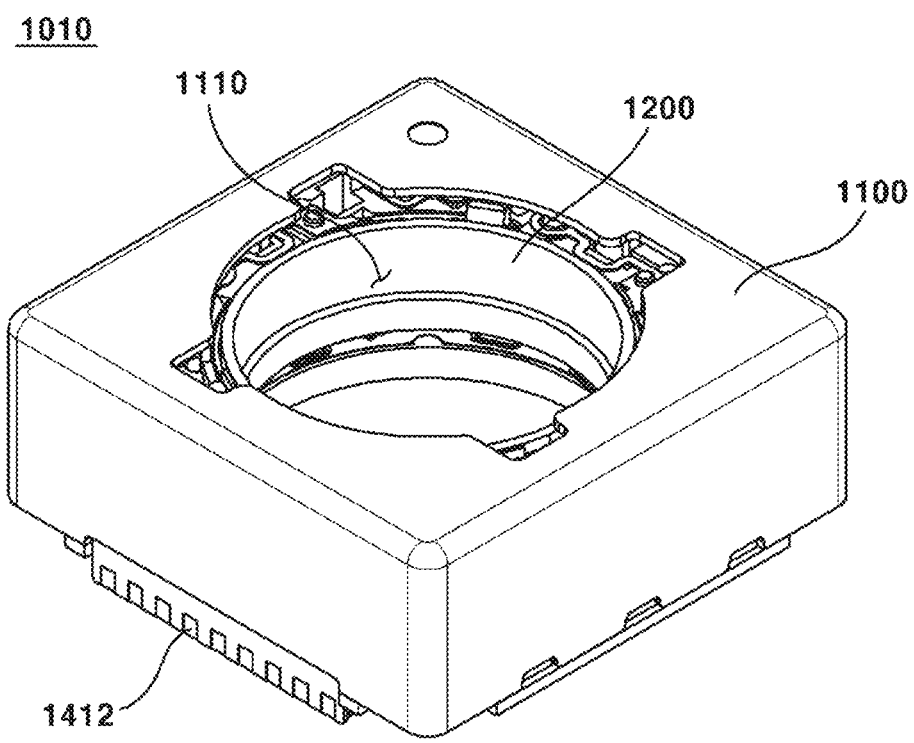
FIG. 6 is a perspective view illustrating a lens driving device according to a second exemplary embodiment of the present disclosure.
Figure 7:
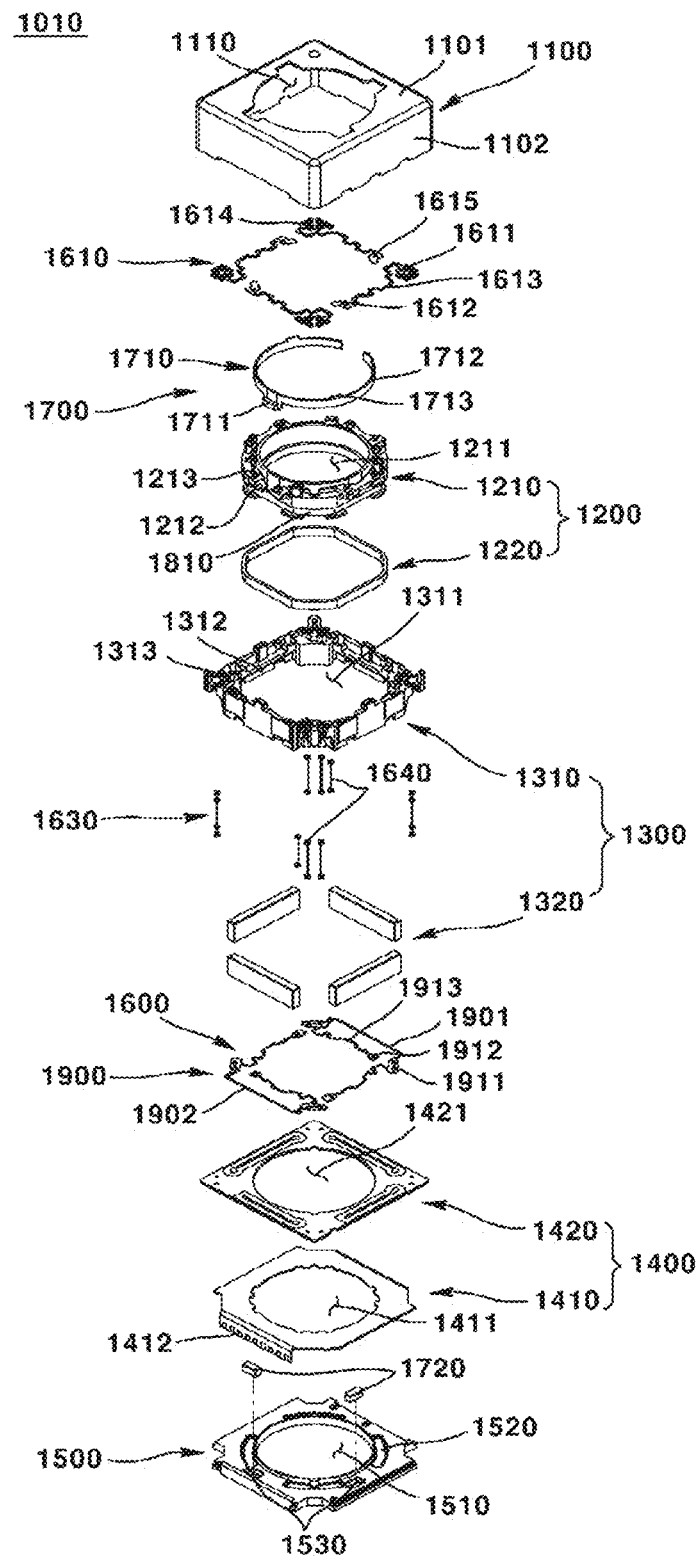
FIG. 7 is an exploded perspective view illustrating a lens driving device according to a second exemplary embodiment of the present disclosure.
Figure 8:
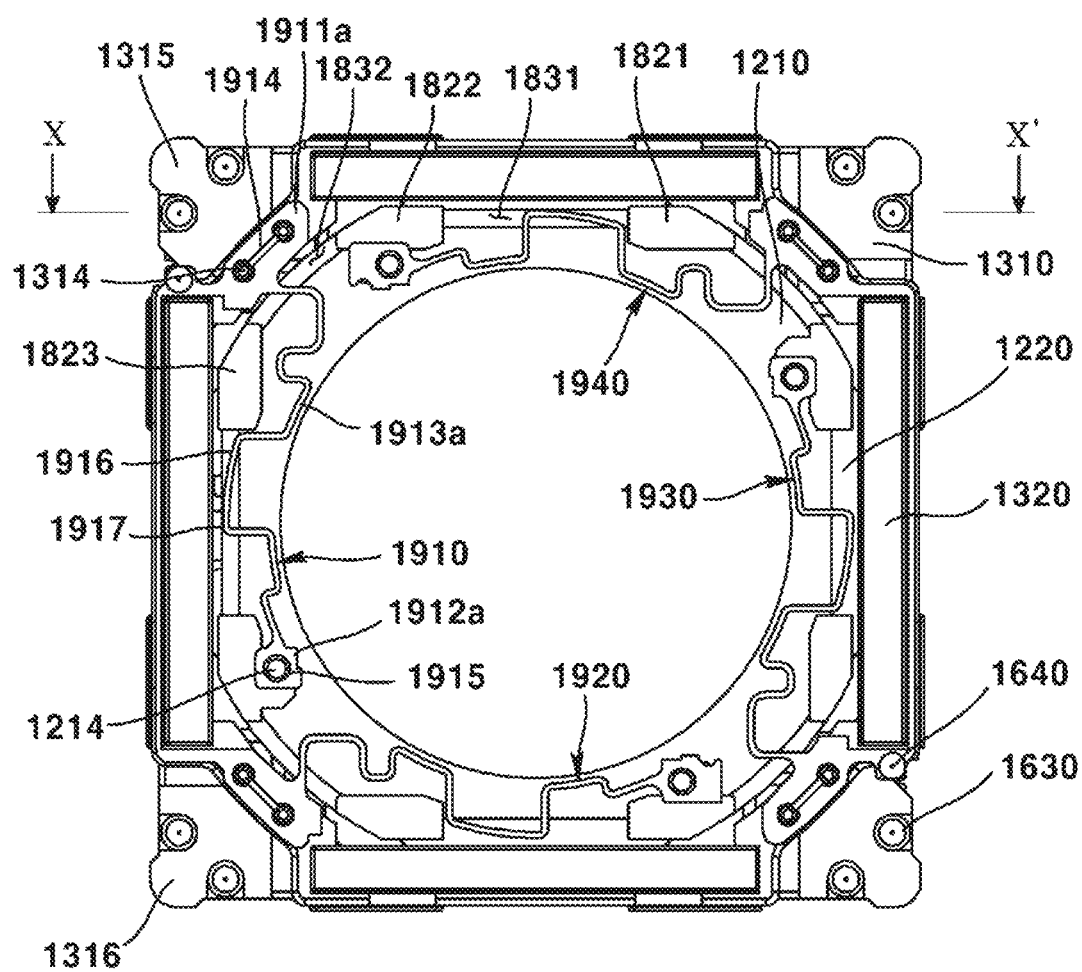
FIG. 8 is a bottom view illustrating partial components of a lens driving device according to a second exemplary embodiment of the present disclosure.
Figure 9:
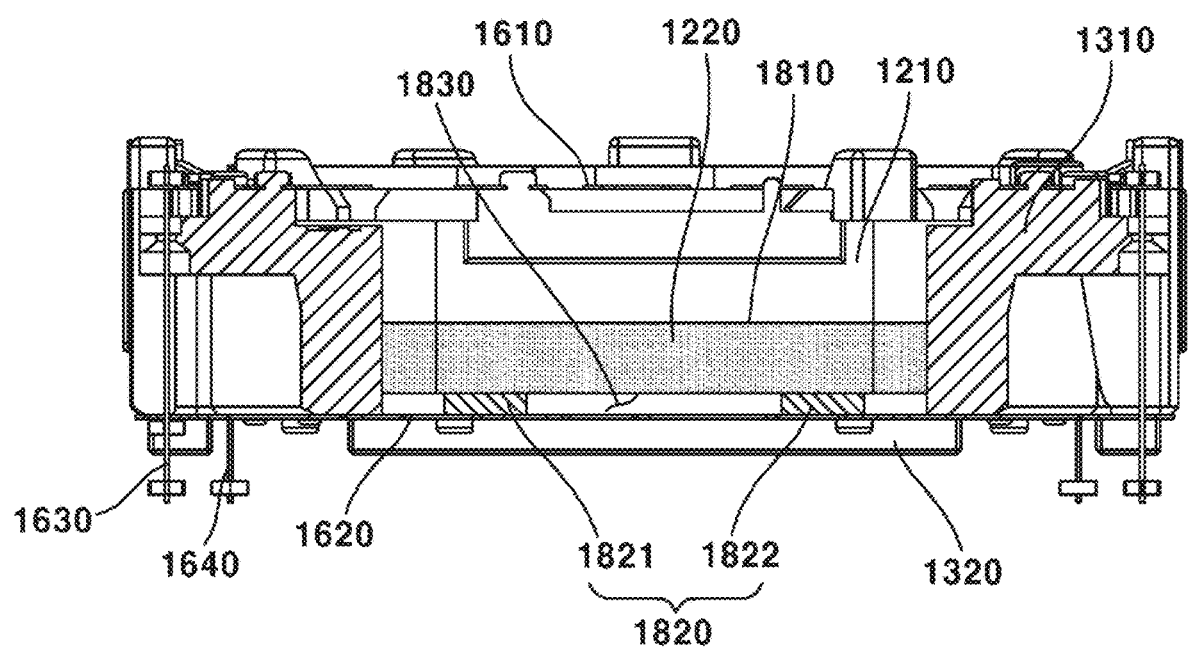
FIG. 9 is a sectional view in the direction of X-X' line of FIG. 9.

FIG. 6 is a perspective view illustrating a lens driving device according to a second exemplary embodiment of the present disclosure, FIG. 7 is an exploded perspective view illustrating a lens driving device according to a second exemplary embodiment of the present disclosure, FIG. 8 is a bottom view illustrating partial components of a lens driving device according to a second exemplary embodiment of the present disclosure, and FIG. 9 is a sectional view in the direction of X-X' line of FIG. 9.

Referring to FIGS. 6 to 9, the lens driving device (1010) according to a second exemplary embodiment of the present disclosure may include a cover member (1100), a first driver (1200), a second driver (1300), a stator (1400), a base (1500), a support member (1600), and a sensing portion (1700). Alternatively, the lens driving device (1010) according to the second exemplary embodiment of the present disclosure may omit at least one of the cover member (1100), the first driver (1200), the second driver (1300), the stator (1400), the base (1500), the support member (1600), and the sensing portion (1700).

The cover member (1100) may form an external appearance of the lens driving device (1010). For example, the cover member (1010) may be formed in a shape of a hexahedron of which lower portion is opened, but not limited hereto. The cover member (1100) may include an upper surface (1101) and a lateral surface (1102) extended downwardly from an outer side of the upper surface (1101). Meanwhile, the cover member (1100) may be installed at an upper portion of the base (1500). The first driver (1200), the second driver (1300), the stator (1400), and the support member (1600) may be disposed at an internal space formed by the cover can (1100) and the base (1500). In addition, the cover member (1100) may be coupled to the base (1500) with an inner lateral surface of the cover member (1100) closely adhered to a part or a whole of a lateral surface of the base (1500). The cover member (1100) may protect internal components from external impacts and inhibit penetration of external pollutants as well.

The cover member (1100) may be formed of metallic material. In particular, the cover member (1100) may be provided as a metallic board. In this case, the cover member (1100) may block electronic interference. That is, the cover member (1100) may inhibit electronic wave generated outside of the lens driving device (1010) from being introduced into the cover member (1100). In addition, the cover member (1100) may inhibit electronic wave generated inside of the cover member (1100) from being released out of the cover member (1100). However, the material forming the cover can (100) is not limited hereto.

The cover member (1100) may include an opening (1110) formed on an upper surface and exposing the lens module. The opening (1110) may be provided in a shape corresponding to a shape of the lens module. That is, the light incident through the opening (1110) may pass through the lens module. Meanwhile, the light that has passed through the lens module may be delivered to the image sensor.

The first driver (1200) may include a bobbin (1210) and a first driving portion (1220). The first driver (1200) may be coupled to the lens module that is a component of a camera module. That is, the lens module may be disposed at an inner side of the first driver (1200). In other words, an inner circumferential surface of the first driver (1200) may be couple to an outer circumferential surface of the lens module. Meanwhile, the first driver (1200) may float integrally with the lens module through an interaction with a second driver (1300). That is, the first driver (1200) may move the lens module.

The first driver (1200) may include a bobbin (1210). In addition, the first driver (1200) may include a first driving portion (1220) coupled to the bobbin (1210).

The bobbin (1210) may be coupled to the lens module. In particular, an outer circumferential surface of the lens module may be coupled to an inner circumferential surface of the bobbin (1210). Meanwhile, the first driving portion (1220) may be coupled to the bobbin (1210). In addition, a lower portion of the bobbin (1210) may be coupled to a lower support member (1900), and an upper portion of the bobbin (1210) may be coupled to an upper support member (1610). The bobbin (1210) may float relative to the housing (1310).

The bobbin (1210) may include a lens coupling portion (1211) formed inside of the bobbin (1210). The lens module may be coupled to the lens coupling portion (1211). A screw thread in a shape corresponding to a shape of a screw thread formed on an outer circumferential surface of the lens module may be formed on an inner circumferential surface of the lens coupling portion (1211). That is, the outer circumferential surface of the lens module may be screw-coupled to the inner circumferential surface of the lens coupling portion (1211).

The bobbin (1210) may include a sensor guide portion (1212) to which a first sensor unit (1710) is coupled. A sensor guide portion (1212) in a shape corresponding to a shape of the first sensor unit (1710) may be provided at an outer circumferential surface of the bobbin (1210). That is, the first sensor unit (1710) may be coupled to the sensor guide portion (1212). The first sensor unit (1710) coupled to the sensor guide portion (1212) may move integrally with the bobbin (1210) to detect the second driving portion (1320) coupled to the housing (1320). Thereby, the movement of the bobbin (1210) may be sensed.

The bobbin (1210) may include a first driving portion coupling portion (1810) on which the first driving portion (1220) is wound or installed. The first driving portion coupling portion (1810) may be integrally formed with an outer lateral surface of the bobbin (1210). In addition, the first driving portion coupling portion (1810) may be continuously formed along an outer circumferential surface of the bobbin (1210), or may be formed be being spaced apart at a predetermined interval.

The first driving portion coupling portion (1810) may include a recessed portion formed by a process where a part of an outer lateral surface of the bobbin (1210) is recessed. A first driving portion (1220) may be disposed at the first driving portion coupling portion (1810). The first driving portion (1220) disposed at the first driving portion coupling portion (1810) may be supported by a support portion (1820).

The bobbin (1210) may include an upper coupling portion (1213) coupled to an upper support member (1610). The upper coupling portion (1213) may be coupled to an inner coupling portion (1615) of the upper support member (1610). According to an exemplary embodiment of the present disclosure, the upper coupling portion (1213) provided as a protrusion may be coupled by being inserted in the inner coupling portion (1615) provided as a groove.

Meanwhile, a protrusion may be provided at the upper support member (1610) and a groove may be provided at the bobbin (1210), such that these two components may be coupled to each other. According to an exemplary embodiment of the present disclosure, as illustrated in FIG. 7, totally four of the upper coupling portion (1213) may be provided at the bobbin (1210).

Meanwhile, the bobbin (1210) may include a lower coupling portion (1214) coupled to the lower support member (1900). The lower coupling portion (1214) formed at the lower portion of the bobbin (1210) may be coupled to the inner coupling portion (1915) of the lower support member (1900). According to an exemplary embodiment of the present disclosure, the lower coupling portion (1214) provided as a protrusion may be coupled by being inserted in the inner coupling portion (1915) provided as a groove.

The first driving portion (1220) may be disposed facing to a second driving portion (1320) of the second driver (1320). The first driving portion (1220) may move the bobbin (1210) with respect to the housing (1310), through electromagnetic interaction with the second driving portion (1320). The first driving portion (1220) may include a coil. The coil may be wound on an outer lateral surface of the bobbin (1210), by being guided by the first driving portion coupling portion (1211).

Alternatively, the coil may include four independent coils, of which two adjacent coils may form a 90 degree angle to be arranged at an outer lateral surface of the bobbin (1210). In a case where the first driving portion (1220) includes a coil, the electric power supplied to the coil may be supplied through the lower support member (1900).

Here, a pair of the lower support members (1900) may be separately provided, in order to supply electric power to the coil. Meanwhile, the first driving portion (1220) may include a pair of lead cables (not illustrated) for electric power supply. In this case, each of the pair of lead cables may be respectively coupled to the pair of the lower support members (1900). Meanwhile, an electromagnetic field may be formed around the coil, when the electric power is supplied to the coil. Alternatively, the first driving portion (1220) may include a magnet. In this case, the second driving portion (1320) may be provided as a coil.

The second driver (1300) may be disposed at an outer side of the first driver (1200) by facing the first driver (1200). The second driver (1300) may be supported by the base (1500) disposed at a lower side. The second driver (1300) may be disposed at an internal space of the cover member (1100).

The second driver (1300) may include a housing (1310) disposed at an outer side of the bobbin (1210). In addition, the second driver (1300) may include a second driving portion (1320) that is disposed facing the first driving portion (1220) and fixed to the housing (1310).

The housing (1310) may be formed in shape corresponding to an inner lateral surface of the cover member (1010) forming an external appearance of the lens driving device (1010). In addition, the housing (1310) may be formed of an insulated material, and may be implemented as an injection molding material, in consideration of productivity. The housing (1310) may be arranged to be spaced apart at a predetermined distance from the cover member (1100), as a movable component for OIS (Optical Image Stabilization) operation.

Alternatively, in the AF (Auto Focus) model, the housing (1310) may be fixed on the base (1500). In addition, in the AF model, the housing (1310) may be omitted, and a magnet operating as the second driving portion (1320) may be fixed to the cover member (1100).

In addition, upper and lower sides of the housing (310) may be opened to accommodate the first driver (1200) movable in up/downward directions. The housing (1310) may internally include an inner space (1311), where upper and lower sides of the inner space (1311) are opened. The first driver (1200) may be movably disposed at the inner space (1311). That is, the inner space (1311) may be provided in a shape corresponding to a shape of the first driver (1200). In addition, an outer circumferential surface of the inner space (1311) may be disposed spacing apart from an outer circumferential surface of the first driver (1200).

The housing (1310) may include a second driving portion coupling portion (1312) at a lateral surface of the housing (1310), where the second driving portion coupling portion (1312) may be formed in a shape corresponding to a shape of the second driving portion (1320) to accommodate the second driving portion (1320). The second driving portion coupling portion (1312) may accommodate the second driving portion (1320) and fix the second driving portion (1320). The second driving portion (1320) may be fixed to the second driving portion coupling portion (1312) using an adhesive (not illustrated).

Meanwhile, the second driving portion coupling portion (1312) may be disposed at an inner circumferential surface of the housing (1310). In this case, there is an advantage in that an electromagnetic interaction with the first driving portion (1220) disposed at an inner side of the second driving portion (1320) can be facilitated.

According to an exemplary embodiment of the present disclosure, a lower portion of the second driving portion coupling portion (1312) may be opened. In this case, there is an advantage in that an electromagnetic interaction between the second driving portion (1320) and the second driving portion (1320) disposed at a lower side of the second driving portion (1320) can be facilitated.

According to an exemplary embodiment of the present disclosure, the second driving portion coupling portions (1312) may be provided in four pieces. The second driving portion (1320) may be respectively couple to the four of the second driving portion coupling portions (1312).

The upper support member (1610) may be coupled to an upper portion of the housing (1310), and the lower support member (1900) may be coupled to a lower portion of the housing (1310). The housing (1310) may include an upper coupling portion (1313) coupled to the upper support member (1610).

The upper coupling portion (1313) may be coupled to an outer coupling portion (1614) of the upper support member (1610). According to an exemplary embodiment of the present disclosure, the upper coupling portion (1313) provided as a protrusion may be coupled by being inserted in the outer coupling portion (1614) provided as a groove. Alternatively, a protrusion may be provided at the upper support member (1610), and a groove may be provided at the housing (1310), such that these two components can be coupled to each other.

Meanwhile, the housing (1310) may include a lower coupling portion (1314) coupled to the lower support member (1900). The lower coupling portion (1314) formed at a lower portion of the housing (1310) may be coupled to an outer coupling portion (1914) of the lower support member (1900). According to an exemplary embodiment of the present disclosure, the lower coupling portion (1314) provided as a protrusion may be coupled by being inserted in the outer coupling portion (1914) provided as a groove.

The second driving portion (1320) may be disposed facing to the first driving portion (1220) of the first driver (1200). The second driving portion (1320) may move the first driving portion (1220) through electromagnetic interaction with the first driving portion (1220). The second driving portion (1320) may include a magnet. The magnet may be fixed at the second driving portion coupling portion (1312) of the housing (1310).

According to an exemplary embodiment of the present disclosure, as illustrated in FIG. 7, four independent magnets may be independently provided and arranged at the housing (1310), where two adjacent magnets may form a 90 degree angle with each other.

That is, the second driving portion (1320) may be arranged at four edges inside of the housing (1310) at a same interval, aiming to efficient use of internal volume. In addition, the second driving portion (1320) may adhere to the housing (1310) using such as an adhesive, but not limited hereto. Meanwhile, the first driving portion (1220) may include a magnet, and the second driving portion (1320) may be provided as a coil.

The stator (1400) may be disposed facing to a lower side of the second driver (1300). Meanwhile, the stator (1400) may move the second driver (1300). In addition, penetrating holes (1411, 1421) corresponding to the lens module may be disposed at a center of the stator (1400).

The stator (1400) may include a third driving portion (1420) disposed facing to a lower side of the second driving portion (1320). In addition, the stator (1400) may include a circuit board (1410) disposed between the third driving portion (1420) and the base (1500).

The circuit board (1410) may include an FPCB (Flexible Printed Circuit Board). The circuit board (1410) may be disposed between the third driving portion (1420) and the base (1500). Meanwhile, the circuit board (1410) may supply electric power to the third driving portion (1420).

In addition, the circuit board (1410) may supply electric power to the first sensor unit (1710) through the lateral support member (1630) and the upper support member (1610). The circuit board (1410) may supply electric power to the first driving portion (1220) through the lateral support member (1630), the upper support member (1610), the connecting member (1640), and the lower support member (1900).

The circuit board (1410) may include a penetrating hole (1411), where the light that has passed through the lens module may pass through the penetrating hole (1411). In addition, the circuit board (1410) may include a terminal portion (1412) that is bent to be exposed to the outside. The terminal portion (1412) may be connected to an external electric power source, such that the circuit board (1410) can be supplied with electric power.

The third driving portion (1420) may include a coil. The housing (1310) fixed with the second driving portion (1320) may be integrally moved by interaction with the second driving portion (1320), when electric power is applied to a coil of the third driving portion (1420). The third driving portion (1420) may be electrically connected or installed on the circuit board (1410).

Meanwhile, the third driving portion (1420) may include a penetrating hole (1421) for penetrating the light of the lens module. In addition, the third driving portion (410) may be formed as an FP (Fine Pattern) coil to be arranged or installed on the circuit board (1410), in consideration of miniaturization (lowering the height in z-axis direction that is an optical axis direction) of the lens driving device (1010).

The base (1500) may support the second driver (1300). A PCB (Printed Circuit Board) may be disposed at a lower side of the base (1500). The base (1500) may include a center hole (1510) formed at a position corresponding to that of the lens coupling portion of the bobbin (1210). The base (1500) may function as a sensor holder protecting the image sensor. Meanwhile, an infrared ray filter may be disposed at the base (1500). The infrared ray filter may be coupled to the center hole (1510) of the base (1500).

According to an exemplary embodiment of the present disclosure, the base (1500) may include a foreign material collecting portion (1520) for collecting foreign materials introduced in the cover member (1100). The foreign material collecting portion (1520) may be disposed on an upper surface of the base (1500) and may include an adhesive material, such that foreign material collecting portion (1520) can collect foreign materials in the inner space, where the foreign materials may be generated by the cover member (1100) and the base (1500).

The base (1500) may further include a sensor installation portion (1530) to which the second sensor (1720) is coupled. That is, the second sensor (1720) may be installed at the sensor installation portion (1530).

Here, the second sensor (1720) may sense movement of the housing (1310) in horizontal directions by detecting the second driving portion (1320) coupled to the housing (1310). According to an exemplary embodiment of the present disclosure, two of the sensor installation portion (1530) may be provided. The second sensor (1720) may be disposed at each of the two sensor installation portions (1320). In this case, the second sensor (1720) may be so arranged as to sense movement of the housing (1310) in both of x-axis and y-axis directions.

The support member (1600) may connect at least any two of the first driver (1200), the second driver (1300), and the base (1500). The support member (1600) may elastically connect at least any two of the first driver (1200), the second driver (1300), and the base (1500), such that a relative movement between each component may be available. That is, the support member (1600) may be provided as an elastic member.

According to an exemplary embodiment of the present disclosure, as illustrated in FIG. 7, the support member (1600) may include the upper support member (1610), the lower support member (1900), the lateral support member (1630), and the conducting member (1640). However, the conducing member (1640) may be provided only for electrical conduction between the upper support member (1610) and the lower support member (1900).

According to an exemplary embodiment of the present disclosure, the upper support member (1610) may include an outer side portion (1611), an inner side portion (1612), and a connecting portion (1613). The upper support member (1610) may include an outer side portion (1611) coupled to the housing (1310), an inner side portion (1612) coupled to the bobbin (1210), and a connecting portion (1613) elastically connecting the inner side portion (1612) and the outer side portion (1611).

The upper support member (1610) may be connected to an upper portion of the first driver (1200) and to an upper portion of the second driver (1300). In particular, the upper support member (1610) may be coupled to an upper portion of the bobbin (1210) and to an upper portion of the housing (1310). The upper support member (1610) may include an outer coupling portion (1614) and an inner coupling portion (1615). The inner coupling portion (1615) of the upper support portion (1610) may be coupled to the upper coupling portion (1213) of the bobbin (1210), and the outer coupling portion (1614) of the upper support member (1610) may be coupled to the upper coupling portion (1313) of the housing (1310).

According to an exemplary embodiment of the present disclosure, the upper support member (1610) may be divided in six pieces. Two of the totally six divided pieces of the upper support member (1610) may be used to apply electric power to the first driving portion (1220). Each of the two upper support member (1610) may be respectively connected to a pair of lower support members (1901, 1902) through the conducting member (1640). Meanwhile, the rest four pieces among the six upper support members (1610) may be used to apply electric power to the first sensor unit (1710) and to input/output information between the controller and the first sensor unit (1710).

According to an exemplary embodiment of the present disclosure, the lower support member (1900) may include a pair of lower support members (1901, 1902). That is, the lower support member (1900) may include a first lower support member (1901) and a second lower support member (1902). Each of the first lower support member (1901) and the second lower support member (1902) may be connected to each of a pair of lead wires of the first driving portion (1220) so as to supply electric power. Meanwhile, a pair of the lower support member (1900) may be electrically connected to the circuit board. Through this structure, the pair of the lower support member (1900) may supply the first driving portion (1220) with electric power supplied from the circuit board.

According to an exemplary embodiment of the present disclosure, the lower support member (1900) may include an outer side portion (1911), an inner side portion (1912), and a connecting portion (1913). The lower support member (1900) may include an outer side portion (1911) coupled to the housing (1310), an inner side portion (1912) coupled to the bobbin (1210), and a connecting portion (1913) elastically connecting the inner side portion (1912) and the outer side portion (1911).

The lower support member (1900) may be connected to a lower portion of the first driver (1200) and to a lower portion of the second driver (1300). In particular, the lower support member (1900) may be coupled to a lower portion of the bobbin (1210) and to a lower portion of the housing (1310). The lower support member (1900) may include an outer coupling portion (1914) and an inner coupling portion (1915). The inner coupling portion (1915) of the lower support member (1900) may be coupled with the lower coupling portion (1214) of the bobbin (1210), and the outer coupling portion (1914) of the lower support member (1900) may be coupled with the lower coupling portion (1314) of the housing (1310).

An end of the lateral support member (1630) may be fixed to the stator (1400) or to the base (1500), and another end of the lateral support member (1630) may be coupled to the upper support member (1610) or to the second driver (1300).

According to an exemplary embodiment of the present disclosure, an end of the lateral support member (1630) may be couple to the base (1500), and another end of the lateral support member (1630) may be coupled to the second driver (1300). Alternatively, an end of the lateral support member (1630) may be couple to the stator (1400), and another end of the lateral support member (1630) may be coupled to the upper support member (1610).

In this wise, the lateral support member (1630) may elastically support the second driver (1300), such that the second driver (1300) can be tilted or moved in horizontal directions.

According to an exemplary embodiment of the present disclosure, the lateral support member (1630) may be provided in the same number as the number in which the upper support member (1610) is provided. That is, six of the lateral support member (1630) may be provided and respectively connected to six of the upper support member (1610). In this case, the lateral support member (1630) may supply electric power supplied from the stator (1400) to each of the upper support members (1610). According to an exemplary embodiment of the present disclosure, the number of the lateral support member (1630) may be determined in consideration of symmetry. According to an exemplary embodiment of the present disclosure, as illustrated in FIG. 7, totally eight of the lateral support member (1630) may be provided, two pieces at each of edges of the housing (1310).

According to an exemplary embodiment of the present disclosure, the lateral support member (1630) may be coupled to the upper support member (1610) and may include a structure for absorbing impacts. The structure for absorbing impacts may be provided at at least one of the lateral support member (1630) and the upper support member (1610). The structure for absorbing impacts may be a separate member such as a damper. Alternatively, the structure for absorbing impacts may be implemented through shape modification at some part of at least one of the lateral support member (1630) and the upper support member (1610).

The conducting member (1640) may electrically connect the upper support member (1610) and the lower support member (1900). The conducting member (1640) may be provided in separation from the lateral support member (1630). The electric power supplied to the upper support member (1610) may be supplied to the lower support member (1900) through the conducting member (1640). The electric power may be supplied to the first driving portion (1220) through the lower support member (1900).

The sensor portion (1700) may be used for at least one of AF (Auto Focus) feedback and OIS (Optical Image stabilization) feedback. That is, the sensor portion (1700) may detect a position or movement of at least one of the first driver (1200) and the second driver (1300).

According to an exemplary embodiment of the present disclosure, the sensor portion (1700) may include a first sensor unit (1710) and a second sensor (1720). The first sensor unit (1710) may sense relative upward/downward floating of the bobbin (1210) with respect to the housing (1310) so as to provide information for the AF feedback. The second sensor (1720) may sense tilt or movement in horizontal directions of the second driver (1300) so as to provide information for the OIS feedback.

The first sensor unit (1710) may be disposed at the first driver (1200). In particular, the first sensor unit (1710) may be disposed at the bobbin (1210). The first sensor unit (1710) may be fixed by being inserted in the second guide portion (1212) formed on an outer circumferential surface of the bobbin (1210).

According to an exemplary embodiment of the present disclosure, the first sensor unit (1710) may include a first sensor (1711), a flexible circuit board (1712), and a terminal portion (1713).

The first sensor (1711) may sense movement or position of the bobbin (1210). In addition, the first sensor (1711) may sense a position of the second driving portion (1320) installed at the housing (1310). According to an exemplary embodiment of the present disclosure, the first sensor (1711) may be a Hall sensor. The first sensor (1711) may sense a relative position between the bobbin (1210) and the housing (1310) by sensing magnetic force generated from the second driving portion (1320).

The first sensor (1711) may be fixed to the flexible circuit board (1712). According to an exemplary embodiment of the present disclosure, as illustrated in FIG. 7, the flexible circuit board (1712) may be provided in shape of a band. At least a part of the flexible circuit board (1712) may be provided in shape corresponding to a shape of the sensor guide portion (1212) of the bobbin (1210), and may be inserted in the sensor guide portion (1212).

According to an exemplary embodiment of the present disclosure, the flexible circuit board (1712) may be an FPCB (Flexible Printed Circuit Board). That is, the flexible circuit board (1712) may be provided flexible, and may be bent in response to a shape of the sensor guide portion (1212).

A terminal portion (1713) may be formed at the flexible circuit board (1712). The terminal portion (1713) may be supplied with electric power, and may supply the electric power to the first sensor (1711) through the flexible circuit board (1712). In addition, the terminal portion (1713) may receive a control command with respect to the first sensor (1711), or may transmit a value sensed from the first sensor (1711).

According to an exemplary embodiment of the present disclosure, four of the terminal portions (1713) may be provided, and may be electrically connected to the upper elastic member (1610). In this case, two of the four terminal portions (1713) may be used to receive electric power from the upper support member (1610), and the rest two of terminal portions (1713) may be used to transmit/receive information.

The second sensor (1720) may be disposed at the stator (1400). The second sensor portion (1720) may be disposed at an upper or a lower surface of the circuit board (1410) of the stator (1400). According to an exemplary embodiment of the present disclosure, the second sensor (1720) may be arranged at a lower surface of the circuit board to be disposed at the sensor installation portion (1530) formed at the base (1500).

According to an exemplary embodiment of the present disclosure, the second sensor (1720) may include a Hall sensor. In this case, the second sensor (1720) may sense relative floating of the second driver (1300) with respect to the stator (1400) by sensing magnetic field of the second driving portion (1320) of the second driver (1300). According to an exemplary embodiment of the present disclosure, at least two pieces of the second sensor (1720) may be provided so as to sense movement of the second driver in both of x-axis and y-axis directions.

The bobbin (1210) may include a first driving portion coupling portion (1810) disposed at an outer circumferential surface and disposed with the first driving portion (1220). That is, the first driving portion (1220) may be coupled to the first driving portion coupling portion (1810). The first driving portion coupling portion (1810) may be formed by a process where an outer circumferential surface of the bobbin (1210) is internally recessed.

The bobbin (1210) may include a support portion (1820) extended from the first driving portion coupling portion (1810) and supporting the first driving portion (1220). That is, the support portion (1820) may support the first driving portion (1220) at a side. According to an exemplary embodiment of the present disclosure, the support portion (1820) may be extended from the first driving portion coupling portion (1810) downwardly and outwardly, so as to support a lower portion of the first driving portion (1220).

The support portion (1820) may include a plurality of support bodies (1821, 1822, 1823) disposed along an outer circumferential surface of the bobbin (1210) and spaced apart from each other. The support portion (1820) may be steppedly provided to support a lower portion of the first driving portion (1220). A separating space (1830) may be formed between the plurality of support bodies (1821, 1822, 1823). The support member (1600) may be disposed at the separating space (1830). In particular, the lower support member (1900) may be disposed at the separating space (1830).

The lower support member (1900) may include an outer side portion (1911) coupled to the housing (1310), an inner side portion (1912) coupled to the bobbin (1210), and a connecting portion (1913) elastically connecting the inner side portion (1912) and the outer side portion (1911). Meanwhile, the connecting portion (1913) may be disposed at the separating space (1830) formed between the plurality of support bodies (1821, 1822, 1823).

According to an exemplary embodiment of the present disclosure, as illustrated in FIG. 8, the lower support member may include four support units (1910, 1920, 1930, 1940). That is, the lower support member (1900) may include a first support unit (1910), a second support unit (1920), a third support unit (1930), and a fourth support unit (1940).

Meanwhile, each of the four support units (1910, 1920, 1930, 1940) may include a first inner side portion (1912*a*) coupled to the bobbin (1210), a first outer side portion (1911a) coupled to the housing (1310), and a first connecting portion (1913a) connecting the first inner side portion (1912a) and the first outer side portion (1911a).

The first connecting portion (1913a) may include a plurality of bent portions (1916, 1917) formed by being bent or curved. That is, the first connecting portion (1913a) may include a first bent portion (1916) and a second bent portion (1917). Meanwhile, at least two of the plurality of bent portions (1916, 1917) may be disposed at the separating space (1830). That is, the first bent portion (1916) and the second bent portion (1917) may be disposed at the separating space (1830).

A plurality of the separating spaces (1830) may be provided. According to an exemplary embodiment of the present disclosure, eight of the separating spaces (1830) may be provided. Here, eight of the support portions (1820) may also be provided. Meanwhile, at least a part of the first connecting portion (1913a) may be disposed at least one of the plurality of separating spaces (1830).

In particular, the support portion (1820) may include a first support body (1821), a second support body (1822) disposed adjacent to the first support body (1821), and a third support body (1823) disposed adjacent to the second support body (1822).

Here, the separating space (1830) may include a first separating space (1831) disposed between the first support body (1821) and the second support body (1822), and a second separating space (1832) disposed between the second support body (1822) and the third support body (1823). That is, the first separating space (1831) and the second separating space (1832) may be disposed by having the second support body (1822) therebetween.

In other words, the first separating space (1831) may be disposed at a side of the second support body (1822), and the second separating space (1832) may be disposed at another side of the second support body (1822). The first separating space (1831) and the second separating space (1832) may be disposed adjacent to each other.

At least a part of the first connecting portion (1913a) may be disposed at both of the first separating space (1831) and the second separating space (1832). Alternatively, at least a part of the first connecting portion (1913a) may be disposed at any one of the first separating space (1831) and the second separating space (1832).

The housing (1310) may include a first housing edge portion (1315) formed by lateral surface encountering each other, and a second housing edge portion (1316) disposed adjacent to the first housing edge portion (1315).

According to an exemplary embodiment of the present disclosure, the housing (1310) may include four edge portions or corner portions. The first housing edge portion (1315) and the second housing edge portion (1316) may not be disposed diagonal to each other.

Here, the first outer side portion (1911a) may be disposed closer to the first housing edge portion (1315) than to the second housing edge portion (1316), and the first inner side portion (1912a) may be disposed closer to the second housing edge portion (1316) than to the first housing edge portion (1315). That is, the first outer side portion (1911a) and the first inner side portion (1912a) may be disposed separately with a center of one side surface of the housing (1310) as a basis.

The separating space (1830) may be spaced at a distance corresponding to a distance of the first housing edge portion (1315) and the second housing edge portion (1316). That is, as illustrated in FIG. 8, the separating distance between the second separating space (1832) and the first housing edge portion (1315) may correspond to the separating distance between the second separating space (1832) and the second housing edge portion (1316). However, the first separating space (1831) may be disposed biased to the first housing edge portion (1315).

A part of the first driving portion (1220) may be exposed through the separating space (1830). Here, the exposed first driving portion (1220) and the connecting portion (1913) may be arranged facing each other. Four separating spaces (1830) may be formed at each of four sides, such that the connecting portion (1913) may be arranged at the separating space (1830). Four separating spaces (1830) may be formed at each of four edges (corners), such that the outer side portion (1911) can be arranged at the separating space (1830).

Hereinafter, operations and effects of the camera module according to a second exemplary embodiment of the present disclosure may be described with reference to the drawings.

At first, an AF (Auto Focus) function of the camera module according to the second exemplary embodiment of the present disclosure will be described. When electric power is applied to the first driving portion (1220), the first driving portion (1220) may be moved with respect to the second driving portion (1320) by electromagnetic interaction between the first driving portion (1220) and the second driving portion (1320) that is provided as a magnet.

Here, the bobbin (1210) coupled with the first driving portion (1220) may be moved integrally with the first driving portion (1220). That is, the bobbin (1210) internally coupled with the lens module may be moved with respect to the housing (1310) in upward and downward directions. This movement of the bobbin (1210) may cause the lens module to move closer to or farther from the image sensor, such that the focus on the subject can be adjusted.

Meanwhile, an AF feedback may be applied in order to implement more precise auto focus control of the camera module according to the second exemplary embodiment of the present disclosure. The first sensor (1711) installed at the bobbin (1210) and provided as a Hall sensor may sense magnetic field of the second driving portion (1320) provided as a magnet fixed to the housing (1310).

Meanwhile, when the bobbin (1210) is relatively moved with respect to the housing (1310), the amount of magnetic field sensed by the first sensor (1711) may be changed. In this wise, the first sensor (1711) may sense a travel amount or a position of the bobbin (1210) in the z-axis direction, and may transmit the sensed value to the controller.

The controller may determine, based on the received sensed value, whether the bobbin (1210) will be additionally moved or not. This process may be generated in real-time. Therefore, the AF function of the camera module according to the second exemplary embodiment of the present disclosure can be performed more precisely through the AF feedback.

Here, the OIS (Optical Image Stabilization) function of the camera module according to the second exemplary embodiment of the present disclosure will be described. When electric power is applied to the third driving portion (1420), the second driving portion (1320) may be moved with respect to the third driving portion (1420) by electromagnetic interaction between the third driving portion (1420) and the second driving portion (1320) that is provided as a magnet.

Here, the housing (1310) coupled with the second driving portion (1320) may be moved integrally with the second driving portion (1320). That is, the housing (1310) may be moved with respect to the base (1500) in horizontal directions.

Meanwhile, the housing (1310) may be induced to tilt with respect to the base (1500). Such movement of the housing (1310) may cause the lens module to move with respect to the image sensor in a direction parallel to a direction where the image sensor is positioned. Thereby, the OIS function may be performed.

Meanwhile, an OIS feedback may be applied in order to implement more precise OIS control of the camera module according to the second exemplary embodiment of the present disclosure. A pair of the second sensors (1720) installed at the base (1500) and provided as a Hall sensor may sense magnetic field of the second driving portion (1320) provided as a magnet fixed to the housing (1310).

Meanwhile, when the housing (1310) is relatively moved with respect to the base (1500), the amount of magnetic field sensed by the second sensor (1720) may be changed. In this wise, the second sensor (1720) may sense a travel amount or a position of the housing (1310) in horizontal (x-axis and y-axis) directions, and may transmit the sensed value to the controller.

The controller may determine, based on the received sensed value, whether the housing (1310) will be additionally moved or not. This process may be generated in real-time. Therefore, the OIS function of the camera module according to the second exemplary embodiment of the present disclosure can be performed more precisely through the OIS feedback.

Here, a structure movably supporting the bobbin (1210) with respect to the housing (1310) may be necessarily required in order to perform the AF function as described in the foregoing.

Meanwhile, according to the second exemplary embodiment of the present disclosure, the camera module include the lower support member (1900) elastically supporting the bobbin (1210) with respect to the housing (1310).

Here, the lower support member (1900) may be provided as an elastic member that is long in length and wide in width. This is because the conventional elastic member that is short in length and narrow in with may oscillate at the resonance point, in particular, at the second resonance point formed around 200 Hz.

At least a part of the lower support member (1900) of the camera module according to the second exemplary embodiment of the present disclosure may be disposed at the separating spaces (1830) formed between a plurality of support portions (1820) disposed along an outer circumference of the bobbin (1210). Therefore, the lower support member (1900) may be provided longer in length and wider in width, in comparison with the conventional art.

In the above, all elements composing an exemplary embodiment of the present disclosure have been described as being integrally combined or operating in combination, however, the present disclosure is not limited hereto. That is, within the scope of purpose of the present disclosure, at least one of all such elements may be selectively combined to operate. In addition, the terms such as "include", "comprise" or "have" are state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the above, exemplary embodiments of the present disclosure have been described. However, these embodiments are merely examples and do not limit the present invention, so that persons who skilled in the art of the present disclosure may easily transform and modify within the limit of the technical spirit of the present disclosure. For example, each of the components shown in detail in the embodiments of the present invention may be implemented in transformation. In addition, the differences relating these transformations and modifications shall be regarded to be included in the scope of the present disclosure as defined in the attached claims of the present disclosure and the equivalents thereof.

What is claimed is:

1. A lens driving device, comprising:
    a housing;
    a bobbin disposed in the housing;
    a sensor sensing a position of at least one of the bobbin and the housing;
    a first driving portion disposed on the bobbin;
    a second driving portion disposed on the housing and facing the first driving portion; and
    a plurality of support members movably supporting the bobbin and the housing,
    wherein each of the plurality of support members includes a first end coupled to the bobbin and a second end coupled to the housing,
    wherein the support member includes a first support unit and a second support unit disposed not parallel to the first support unit and a fourth support unit disposed parallel to second support unit,
    wherein the first end of the first support unit is disposed close to the second end of the second support unit, and
    wherein the second end of the first support unit is disposed close to the first end of the fourth support unit.

2. The lens driving device of claim 1, wherein the sensor is disposed more adjacent to the first support unit than to the second support unit; and
    wherein a thickness of the first support unit is thinner than a thickness of the second support unit.

3. The lens driving device of claim 1, wherein a cross-sectional area of the first end is smaller than that of the second end.

4. The lens driving device of claim 1, wherein the second end is disposed in a corner area of the support member.

5. The lens driving device of claim 1, wherein an elastic modulus of the first support unit is lower than an elastic modulus of the second support unit.

6. The lens driving device of claim 1, wherein the support member includes a third support unit disposed apart from and parallel to the first support unit.

7. The lens driving device of claim 6, wherein the support member includes:
    an upper support member connecting an upper portion of the housing and an upper portion of the bobbin; and
    a lower support member connecting a lower portion of the housing and a lower portion of the bobbin, wherein a support member, chosen between the upper elastic member and the lower elastic member, disposed adjacent to the sensor includes the first to the fourth support units.

8. The lens driving device of claim 1, wherein the first support unit includes:
a first support portion disposed closer to the y-axis direction than to the x-axis direction; and
a second support portion disposed closer to the x-axis direction than to the y-axis direction,
wherein an elastic modulus of the first support portion is lower than an elastic modulus of the second support portion.

9. The lens driving device of claim 1, wherein the second support unit includes:
a first support portion disposed closer to the y-axis direction than to the x-axis direction; and
a second support portion disposed closer to the x-axis direction than to the y-axis direction,
wherein an elastic modulus of the first support portion is lower than an elastic modulus of the second support portion.

10. The lens driving device of claim 1, wherein a length of the first support unit is longer than a length of the second support unit.

11. The lens driving device of claim 1, comprising:
an FPCB (Flexible Printed Circuit Board) being applied with electric power from an external source; and
a lateral support member supporting the housing with respect to a base, and electrically connecting the FPCB and the upper support member,
wherein the sensor is supplied with electric power from the upper support member.

12. The lens driving device of claim 11, comprising:
a connecting member electrically connecting the upper support member and the lower support member,
wherein a coil disposed at an outer circumferential surface of the bobbin is supplied with electric power from the lower elastic member.

13. The lens driving device of claim 12, wherein
the upper support member includes a fifth support unit and a sixth support unit,
the first to the fourth support units are connected to the sensor, and
the fifth support unit and the sixth support unit are connected to the lower support member.

14. The lens driving device of claim 1, comprising:
a third driving portion disposed at a lower side of the housing and facing the second driving portion.

15. The lens driving device of claim 1, wherein the first driving portion includes a coil, the second driving portion includes a magnet, and the third driving portion includes a coil.

16. The lens driving device of claim 1, wherein the support member comprises an inner portion coupled to the bobbin, an outer portion coupled to the housing, and a connecting portion connecting the inner portion and the outer portion, and
wherein the connecting portion includes a first end coupled to the inner portion and a second end coupled to the outer portion.

17. The lens driving device of claim 16, wherein the bobbin includes a first opening and a second opening disposed between the first end and the second end of the connecting portion so that at least a part of the first driving portion is exposed in view of a bottom side of the bobbin.

18. The lens driving device of claim 17, wherein the first opening and the second opening are spaced apart from each other.

19. A camera module including a lens driving device of claim 1.

20. An optical apparatus including a camera module of claim 19.

* * * * *